United States Patent
Yamada et al.

(10) Patent No.: US 10,367,203 B2
(45) Date of Patent: Jul. 30, 2019

(54) SECONDARY BATTERY-USE ANODE, SECONDARY BATTERY, BATTERY PACK, ELECTRIC VEHICLE, ELECTRI POWER STORAGE SYSTEM, ELECTRIC POWER TOOL, AND ELECTRONIC APPARATUS

(71) Applicant: SONY CORPORATION, Tokyo (JP)

(72) Inventors: Ichiro Yamada, Tochigi (JP); Takuma Sakamoto, Tochigi (JP); Yuichiro Asakawa, Tochigi (JP); Atsushi Nishimoto, Tochigi (JP)

(73) Assignee: Murata Manufacturing Co., Ltd, Kyoto (JP)

(*) Notice: Subject to any disclaimer, the term of this patent is extended or adjusted under 35 U.S.C. 154(b) by 432 days.

(21) Appl. No.: 14/917,484

(22) PCT Filed: Jul. 29, 2014

(86) PCT No.: PCT/JP2014/069908
§ 371 (c)(1),
(2) Date: Mar. 8, 2016

(87) PCT Pub. No.: WO2015/037353
PCT Pub. Date: Mar. 19, 2015

(65) Prior Publication Data
US 2016/0218368 A1     Jul. 28, 2016

(30) Foreign Application Priority Data
Sep. 13, 2013   (JP) .................................. 2013-190031

(51) Int. Cl.
H01M 4/62    (2006.01)
H01M 4/485   (2010.01)
(Continued)

(52) U.S. Cl.
CPC ............. H01M 4/628 (2013.01); B60L 50/64 (2019.02); H01M 4/131 (2013.01); H01M 4/133 (2013.01);
(Continued)

(58) Field of Classification Search
None
See application file for complete search history.

(56) References Cited

U.S. PATENT DOCUMENTS

2002/0172860 A1* 11/2002 Lilia ....................... H01M 4/36
429/218.1
2009/0136855 A1* 5/2009 Yamaguchi ........... H01M 4/134
429/343
(Continued)

FOREIGN PATENT DOCUMENTS

| CN | 101447569 | 6/2009 |
| CN | 101663782 | 3/2010 |

(Continued)

OTHER PUBLICATIONS

Chinese Office Action dated Jan. 22, 2018 in corresponding Chinese Application No. 201480049107.3.
(Continued)

*Primary Examiner* — Alix E Eggerding
(74) *Attorney, Agent, or Firm* — K&L Gates LLP

(57) ABSTRACT

A secondary battery includes: a cathode; an anode; and a nonaqueous electrolytic solution. The anode includes an anode active material containing an electrode compound, the electrode compound inserting and extracting an electrode reactant at a potential (a potential to lithium) of 1 V to 3 V both inclusive, and a metal salt containing one or both of a carboxylic acid compound and a sulfonic acid compound.

11 Claims, 7 Drawing Sheets

(51) Int. Cl.

| | | |
|---|---|---|
| *H01M 10/0565* | (2010.01) | |
| *H01M 10/0525* | (2010.01) | |
| *H01M 4/505* | (2010.01) | |
| *H01M 10/0569* | (2010.01) | |
| *H01M 4/131* | (2010.01) | |
| *H01M 4/133* | (2010.01) | |
| *H01M 4/134* | (2010.01) | |
| *H01M 4/36* | (2006.01) | |
| *H01M 4/38* | (2006.01) | |
| *H01M 4/525* | (2010.01) | |
| *H01M 4/587* | (2010.01) | |
| *H01M 10/42* | (2006.01) | |
| *H02J 7/00* | (2006.01) | |
| *B60L 50/64* | (2019.01) | |
| *H01M 2/02* | (2006.01) | |
| *H01M 4/02* | (2006.01) | |

(52) U.S. Cl.
CPC ........... *H01M 4/134* (2013.01); *H01M 4/364* (2013.01); *H01M 4/386* (2013.01); *H01M 4/485* (2013.01); *H01M 4/505* (2013.01); *H01M 4/525* (2013.01); *H01M 4/587* (2013.01); *H01M 10/0525* (2013.01); *H01M 10/0565* (2013.01); *H01M 10/0569* (2013.01); *H01M 10/4257* (2013.01); *H02J 7/0029* (2013.01); *H01M 2/0237* (2013.01); *H01M 2004/027* (2013.01); *H01M 2004/028* (2013.01); *H01M 2220/20* (2013.01); *H01M 2220/30* (2013.01); *H02J 7/0047* (2013.01); *H02J 7/0091* (2013.01); *H02J 2007/004* (2013.01); *H02J 2007/005* (2013.01); *H02J 2007/0037* (2013.01); *Y02E 60/122* (2013.01); *Y02T 10/705* (2013.01); *Y02T 10/7011* (2013.01)

(56) References Cited

U.S. PATENT DOCUMENTS

| | | | | |
|---|---|---|---|---|
| 2011/0177398 | A1* | 7/2011 | Affinito | H01M 4/134 |
| | | | | 429/325 |
| 2012/0270093 | A1* | 10/2012 | Isozaki | H01M 4/131 |
| | | | | 429/156 |
| 2014/0030609 | A1* | 1/2014 | Abe | H01G 11/06 |
| | | | | 429/326 |

FOREIGN PATENT DOCUMENTS

| | | |
|---|---|---|
| CN | 103078096 | 5/2013 |
| JP | 08-078058 | 3/1996 |
| JP | H08171916 | 7/1996 |
| JP | 2001-057232 | 2/2001 |
| JP | 2002-117856 | 4/2002 |
| JP | 2003-007303 | 1/2003 |
| JP | 2003007303 | 1/2003 |
| JP | 2004-171875 | 6/2004 |
| JP | 2005-317508 | 2/2005 |
| JP | 200926691 | 7/2007 |
| JP | 200954475 | 8/2007 |
| JP | 2009-193780 | 2/2008 |
| JP | 200976468 | 12/2008 |
| JP | 2012-169576 | 2/2011 |
| JP | 2012-174437 | 2/2011 |
| JP | 2012-174465 | 2/2011 |

OTHER PUBLICATIONS

Chinese Search Report issued in corresponding Chinese Application No. 201480049107.3.
International Search Report issued in PCT/JP2014/069908, dated Oct. 28, 2014 (2 pages).
Japanese Office Action dated Jun. 26, 2018 in corresponding Japanese Application No. 2015-536486.

* cited by examiner

[ FIG. 1 ]
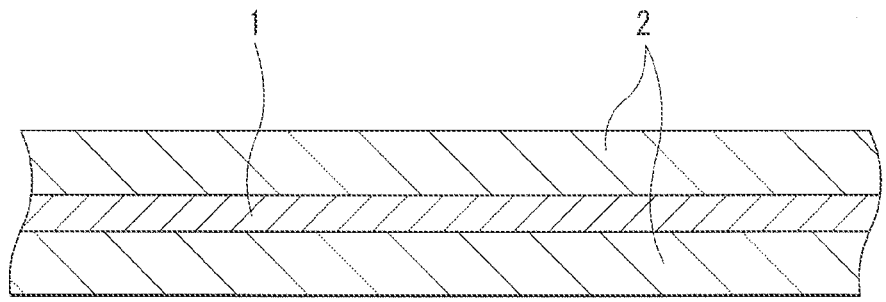

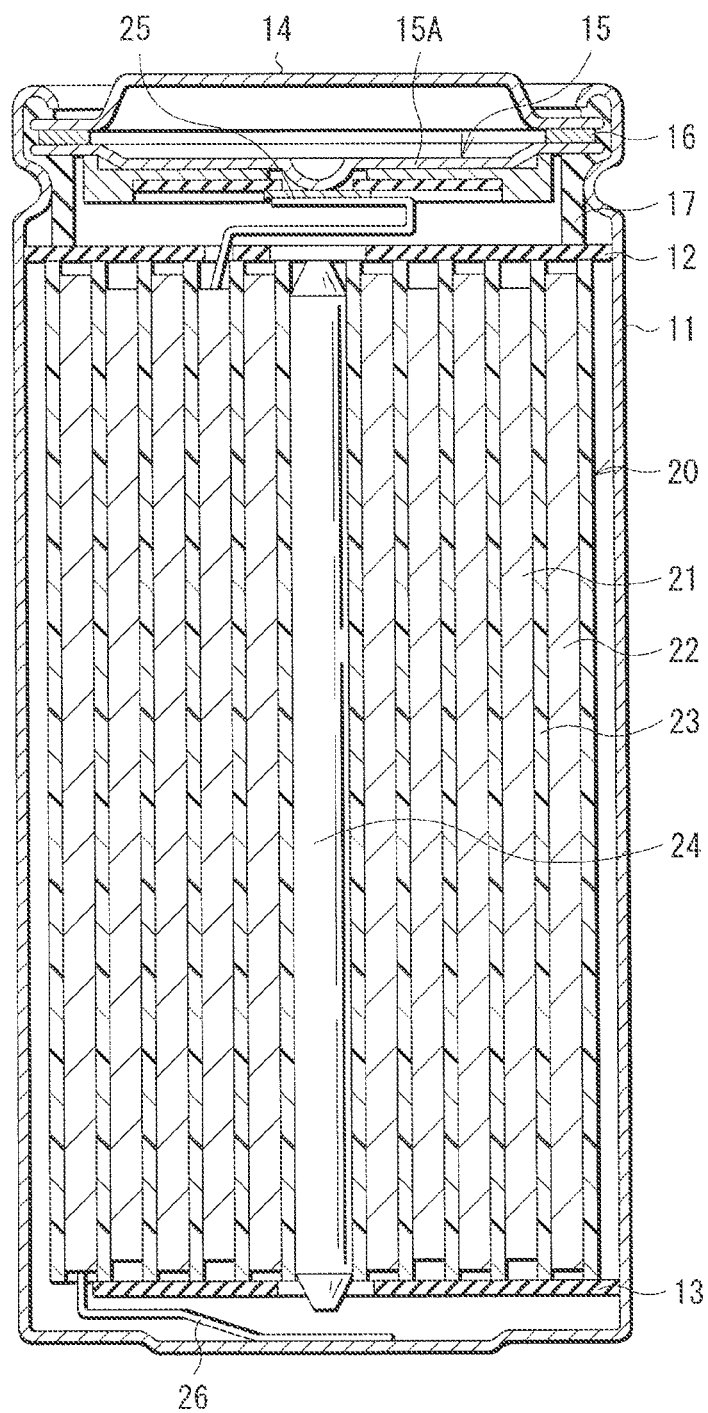
[ FIG. 2 ]

[ FIG. 3 ]
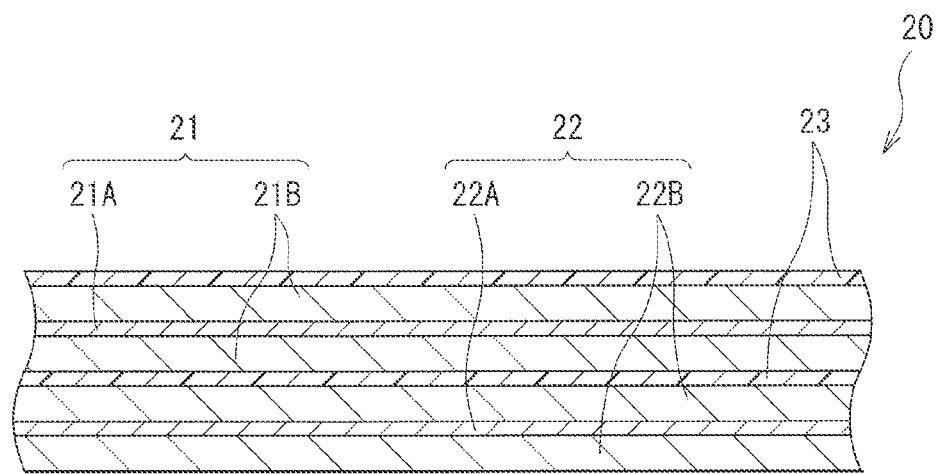

[FIG. 4]
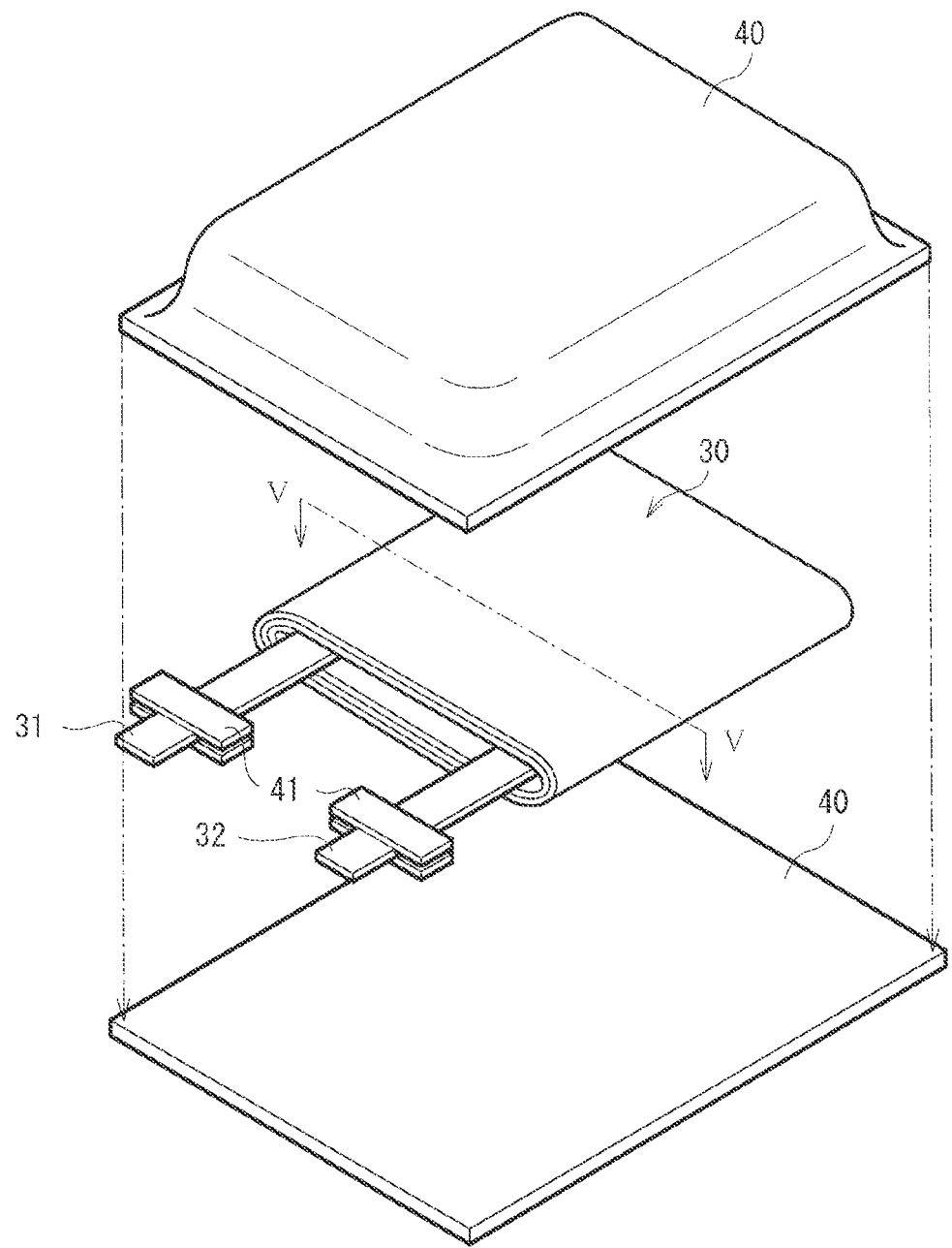

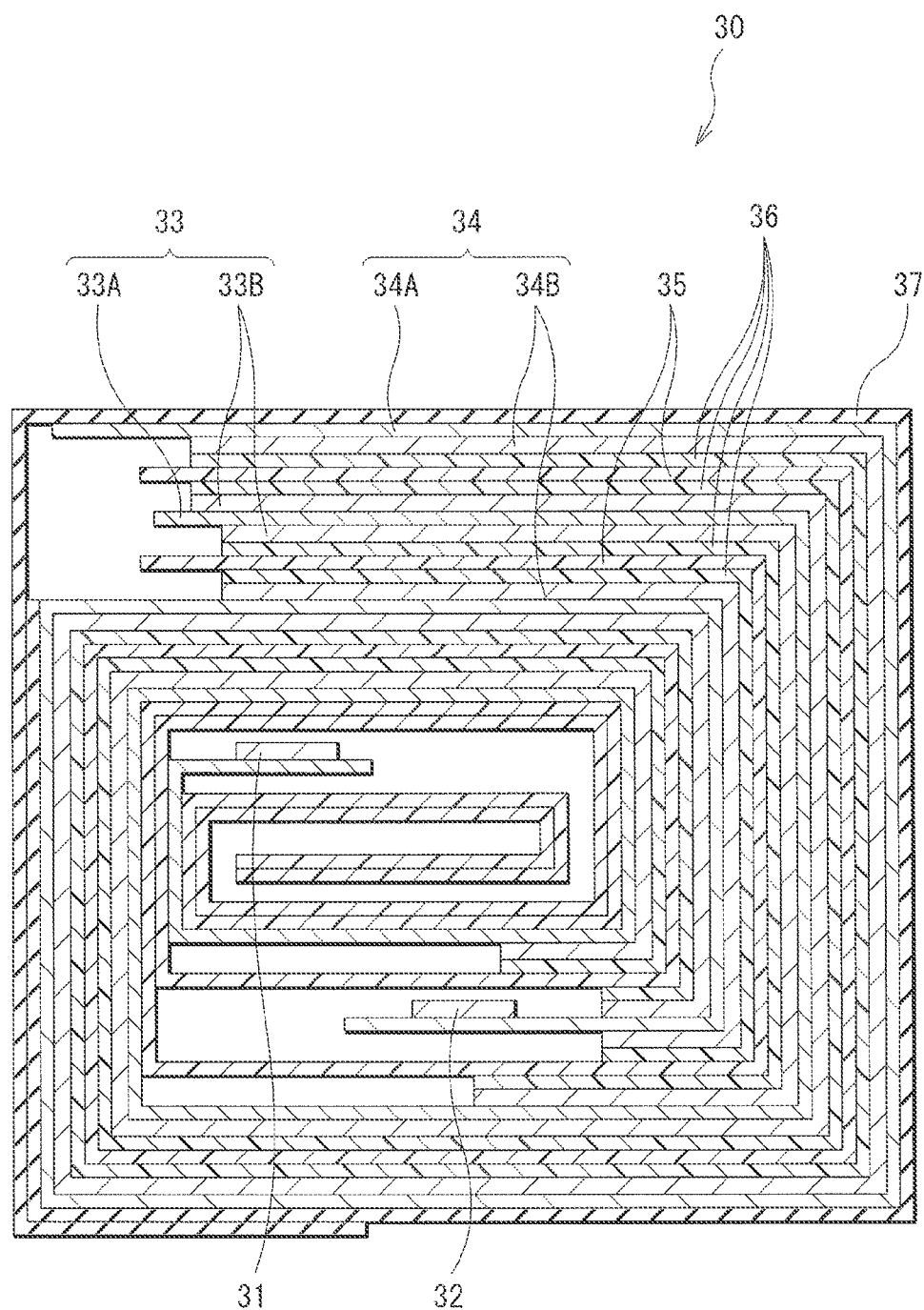
[FIG.5]

[FIG. 6]
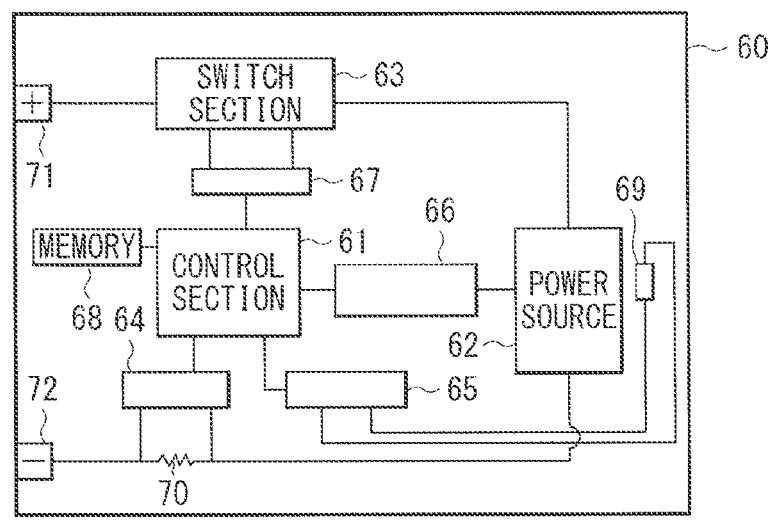
[FIG. 7]
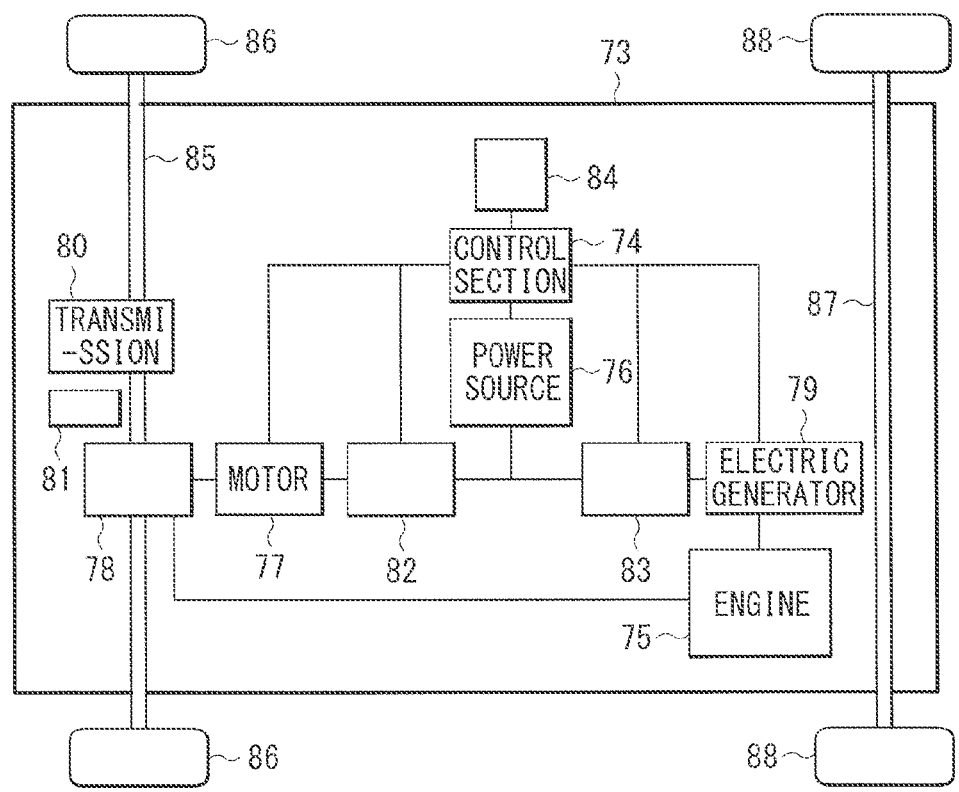

[ FIG. 8 ]
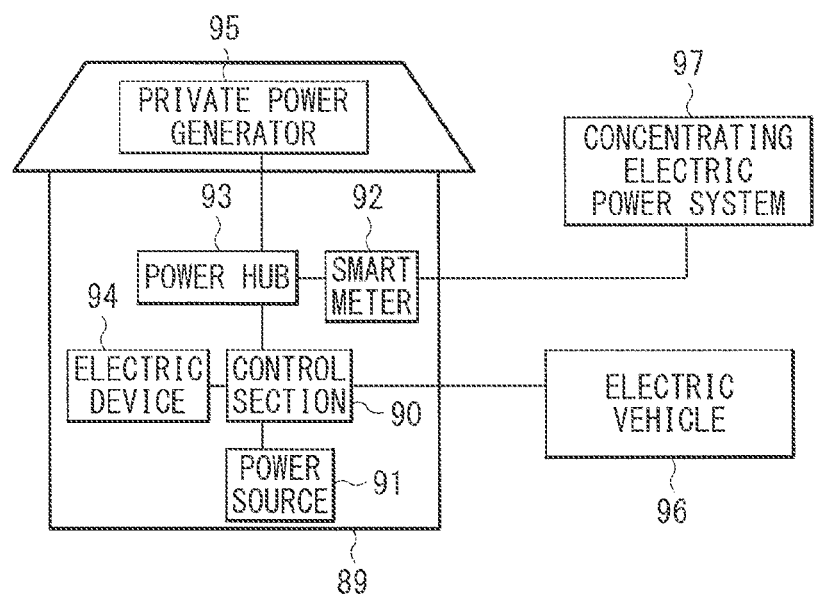
[ FIG. 9 ]
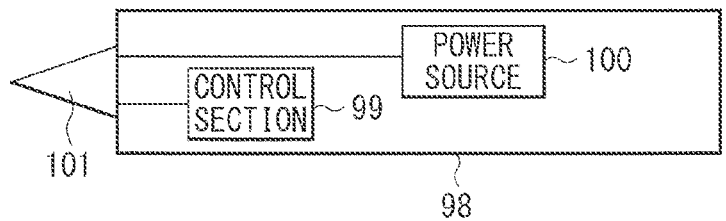

SECONDARY BATTERY-USE ANODE, SECONDARY BATTERY, BATTERY PACK, ELECTRIC VEHICLE, ELECTRI POWER STORAGE SYSTEM, ELECTRIC POWER TOOL, AND ELECTRONIC APPARATUS

CROSS REFERENCES TO RELATED APPLICATIONS

The present application is a national stage of International Application No. PCT/JP2014/069908 filed on Jul. 29, 2014 and claims priority to Japanese Patent Application No. 2013-190031 filed on Sep. 13, 2013, the disclosure of which is incorporated herein by reference.

BACKGROUND

The technology relates to a secondary battery-use anode including an anode active material that inserts and extracts an electrode reactant at a potential (a potential to lithium) of 1 V to 3 V both inclusive. The technology relates to a secondary battery that uses the secondary battery-use anode. The technology relates to a battery pack, an electric vehicle, an electric power storage system, an electric power tool, and an electronic apparatus that use the secondary battery.

Various electronic apparatuses such as mobile phones and personal digital assistants (PDAs) have been widely used, and it has been demanded to further reduce size and weight of the electronic apparatuses and to achieve their longer lives. Accordingly, batteries, in particular, small and light-weight secondary batteries that are able to achieve high energy density have been developed as power sources for the electronic apparatuses.

In these days, applications of the secondary battery are not limited to the electronic apparatuses described above, and it has been also considered to apply the secondary battery to various other applications. Examples of such other applications may include: a battery pack attachably and detachably mounted on, for example, an electronic apparatus; an electric vehicle such as an electric automobile; an electric power storage system such as a home electric power server; and an electric power tool such as an electric drill.

There have been proposed secondary batteries that utilize various charge and discharge principles in order to obtain battery capacity. In particular, attention has been paid to a secondary battery that utilizes insertion and extraction of an electrode reactant, because such a secondary battery is able to achieve high energy density.

A secondary battery includes a cathode, an anode, and electrolytic solution. The cathode includes a cathode active material that inserts and extracts an electrode reactant, and the anode includes an anode active material that inserts and extracts the electrode reactant. The electrolytic solution includes a solvent and an electrolyte salt.

As the anode active material, carbon materials such as graphite have been widely used, and metal-based materials such as silicon have been also used in applications needing high capacity. In addition, in order to reduce volume change of the anode active material during charge and discharge, high-potential materials such as lithium-titanium composite oxide have been used. The high-potential materials have a high insertion-extraction potential to an electrode reactant.

For example, a cylindrical type battery structure using a battery can as a member containing the cathode, the anode, and the electrolytic solution has been widely adopted as the battery structure of the secondary battery. A laminated film type battery structure using a laminated film such as an aluminum laminated film has been adopted in applications needing battery shape variability.

Since these secondary battery structures largely influences battery characteristics, various considerations have been made on the structure of the secondary battery.

More specifically, in order to increase battery capacity, the cathode includes an oxidizable agent such as lithium-2-hydroxypropionate (refer to, for example, Patent Literature 1). In order to suppress deterioration of load characteristics, a lithium salt such as lithium 2-hydroxybutanoate is used as an electrolyte salt (refer to, for example, Patent Literature 2).

In addition, in order to achieve superior charge-discharge cycle characteristics and in order to suppress gas generation inside the battery, the cathode includes, for example, lithium 4-hydroxybutyrate or lithium 2-hydroxypropane sulfonate (refer to, for example, Patent Literature 3).

CITATION LIST

Patent Literature

Patent Literature 1: Japanese Unexamined Patent Application Publication No. 2012-174437

Patent Literature 2: Japanese Unexamined Patent Application Publication No. 2012-174465

Patent Literature 3: Japanese Unexamined Patent Application Publication No, 2009-193780

SUMMARY

In spite of various proposals for the structure of the secondary battery, sufficient battery characteristics have not yet been achieved specifically in a case where the high-potential material is used as the anode active material. For this reason, there is still room for improvement.

It is therefore desirable to provide a secondary battery-use anode, a secondary battery, a battery pack, an electric vehicle, an electric power storage system, an electric power tool, and an electronic apparatus that are able to achieve superior battery characteristics.

A secondary battery-use anode according to an embodiment of the technology includes: an anode active material containing an electrode compound, the electrode compound inserting and extracting an electrode reactant at a potential (a potential to lithium) of 1 V to 3 V both inclusive, and a metal salt containing one or both of a carboxylic acid compound represented by the following formula (1) and a sulfonic acid compound represented by the following formula (2).

[Chem. 1]

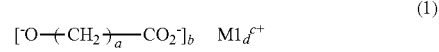

(1)

where M1 is one of an alkali metal element and an alkali-earth metal element, "a" is an integer of 1 or larger, each of "b", "c", and "d" is 1 or 2, and in a care of d=2, one M1 and the other M1 may be of a same kind or different kinds.

[Chem. 2]

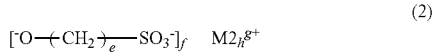
(2)

where M2 is one of an alkali metal element and an alkali-earth metal element, "e" is an integer of 1 or larger, each of "f", "g", and "h" is 1 or 2, and in a case of h=2, one M1 and the other M2 may be of a same kind or different kinds.

A secondary battery according to an embodiment of the technology includes a cathode; an anode; and a nonaqueous electrolytic solution. The anode includes has a configuration similar to that of the secondary battery-use anode according to the foregoing embodiment of the technology. Further, a battery pack, an electric vehicle, an electric power storage system, an electric power tool, and an electronic apparatus according to embodiments of the technology each include a secondary battery, and the secondary battery has a configuration similar to that of the secondary battery according to the foregoing embodiment of the technology.

According to the secondary battery-use anode according to the embodiment of the technology or the secondary battery according to the embodiment of the technology, the anode active material containing the foregoing electrode compound, and the metal salt containing one or both of the foregoing carboxylic acid compound and the foregoing sulfonic acid compound. This makes it possible to achieve superior battery characteristics. Moreover, in the battery pack, the electric vehicle, the electric power storage system, the electric power tool, or the electronic apparatus according to the embodiment of the present technology, a similar effect is achievable.

It is to be noted that effects of the technology are not necessarily limited to the effect described above, and may be any of effects described herein.

Additional features and advantages are described herein, and will be apparent from the following Detailed Description and the figures.

BRIEF DESCRIPTION OF THE FIGURES

FIG. 1 is a sectional view of a configuration of a secondary battery use anode according to an embodiment of the technology.

FIG. 2 is a sectional view of a configuration of a secondary battery (of a cylindrical type) using the secondary battery-we anode according to the embodiment of the technology.

FIG. 3 is an enlarged sectional view of part of a spirally wound electrode body illustrated in FIG. 2.

FIG. 4 is a perspective view of a configuration of another secondary battery (of a laminated film type) using the secondary battery-use anode according to the embodiment of the technology.

FIG. 5 is a sectional view taken along line V-V of a spirally wound electrode body illustrated in FIG. 4.

FIG. 6 is a block diagram of a configuration of an application example (a battery pack) of the secondary battery.

FIG. 7 is a block diagram of a configuration of an application example (an electric vehicle) of the secondary battery.

FIG. 8 is a block diagram of a configuration of an application example (an electric power storage system) of the secondary battery.

FIG. 9 is a block diagram of a configuration of an application example (an electric power tool) of the secondary battery.

DETAILED DESCRIPTION

Some embodiments of the technology are described below in detail with reference to the drawings. The description is given in the following order.
 1. Secondary Battery-use Anode
 2. Secondary Battery Using Secondary Battery-use Anode
 2-1. Cylindrical Type
 2-2. Laminated Film Type
 3. Applications of Secondary Battery
 3-1. Battery Pack
 3-2. Electric Vehicle
 3-3. Electric Power Storage System
 3-4. Electric Power Tool
 (1. Secondary Battery-use Anode)

First, description is given of a secondary battery-use anode according to an embodiment of the technology (hereinafter simply referred to as "anode" or "anode of the technology"). The anode described hereinafter may be used, for example, for a secondary battery such as a lithium-ion secondary battery.

[Configuration of Anode]

FIG. 1 illustrates a sectional configuration of the anode. The anode may include an anode current collector 1 and an anode active material layer 2.

[Anode Current Collector]

The anode current collector 1 may include, for example, one or more of conductive materials such as copper (Cu), nickel (Ni), and stainless steel.

A surface of the anode current collector 22A may be preferably roughened. This mikes it possible to improve adhesibility of the anode active material layer 2 with respect to the anode current collector 1 by a so-called anchor effect. In this case, it may be only necessary to roughen the surface of the anode current collector 1 at least in a region opposed to the anode active material layer 2. Non-limiting examples of a roughening method may include a method of forming fine particles with use of electrolytic treatment. Through the electrolytic treatment, the fine particles are formed on the surface of the anode current collector 1 in an electrolytic bath by an electrolytic method to make the surface of the anode current collector 1 rough. A copper foil fabricated by the electrolytic method is generally called "electrolytic copper foil."

[Anode Active Material Layer]

The anode active material layer 2 may be provided on one or both of surfaces of the anode current collector 1. Note that FIG. 1 illustrates a case where the anode active material layer 2 is provided on both of the surfaces of the anode current collector 1.

The anode active material layer 2 may include an anode active material and a metal salt. The anode active material layer 2 may further include one or more of other materials such as an anode binder and an anode conductor.

The anode active material may include one or more of anode materials that have ability to insert and extract lithium. More specifically, the anode material may include one or more of electrode compounds that inserts and extracts an electrode reactant at a potential (a potential to lithium) of 1 V to 3 V both inclusive (hereinafter referred to as "high-potential materials"). The anode material may include the high-potential material, by which volume change of the anode active material during charge and discharge is reduced, and large-current characteristics are thereby improved. Note that the "electrode reactant" is a material relating to electrode reaction, and may be, for example, lithium (Li) in a lithium-ion secondary battery that obtains capacity by insertion and extraction of lithium.

The kind of the high-potential material is not specifically limited as long as the high-potential material has ability to insert and extract the electrode reactant at a potential (a potential to lithium) of 1 V to 3 V both inclusive. It is necessary for the high-potential material to have ability to insert and extract the electrode reactant at a potential in this range. The high-potential material suppresses decomposition reaction of an electrolytic solution caused by reactivity of the anode (the anode active material), and the large-current characteristics are thereby improved.

The high-potential material may include, for example, one or more of materials that have ability to insert and extract lithium as the electrode reactant. More specifically, the high-potential material may include, for example, one or more of lithium-titanium composite oxide, hydrogen-titanium composite oxide, metal oxides (excluding compounds corresponding to lithium-titanium composite oxide and hydrogen-titanium composite oxide), metal sulfides, and other materials. The lithium-titanium composite oxide is an oxide containing lithium (Li) and titanium (Ti) as constituent elements, and the hydrogen-titanium composite oxide is an oxide containing hydrogen (H) and titanium as constituent elements.

In particular, the high-potential material may preferably include the lithium-titanium composite oxide, which allows the high-potential material to stably insert and extract lithium at a potential in the foregoing range. The lithium-titanium composite oxide may include, in addition to lithium, titanium, and oxygen (O), one or more of elements excluding lithium, titanium, and oxygen as constituent elements.

The lithium-titanium composite oxide may preferably include one or more of compounds represented by the following formula (3). Since it is possible to stably manufacture the lithium-titanium composite oxide, the lithium-titanium composite oxide is easily available.

$$Li_wTi_xM3_yO_z \quad (3)$$

where M3 is one or more of magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt), "w", "x", "y", and "z" satisfy $3 \leq w \leq 7$, $3 \leq x \leq 5$, $0 \leq y \leq 4$, and $10 \leq z \leq 12$.

The kind of M3 is not specifically limited as long as M3 includes one or more of the foregoing metal elements such as magnesium and the foregoing metalloid elements such as boron. In a case where M3 includes two or more of the elements, a ratio of the two or more elements is not specifically limited. Note that, as can be seen from a range of values that "y" is allowed to take, the compound represented by the formula (3) may include or may not include M3 as a constituent element.

Specific examples of the compound represented by the formula (3) may include lithium titanate ($Li_4Ti_5O_{12}$). A potential at which lithium titanate inserts and extracts lithium, i.e., a potential in a plateau region of a charge-discharge curve may be about 1.5.5 V.

In particular, the compound represented by the formula (3) may preferably include, as M3, one or more of magnesium, aluminum, and other elements as constituent elements. This makes the foregoing plateau region flatter, thereby making the potential at which the compound inserts and extracts lithium more stable. Accordingly, continuous charge characteristics of the secondary battery are improved.

Note that the anode material may include one or more of other anode materials together with the foregoing high-potential material.

Examples of the other material may include one or more of carbon materials. The carbon material causes extremely-small change in a crystal structure thereof during insertion and extraction of lithium, which stably achieves high energy density. Further, the carbon material also serves as an anode conductor, which improves conductivity of the anode active material layer 2.

Examples of the carbon material may include graphitizable carbon, nongraphitizable carbon, and graphite. It is to be noted that a spacing of (002) plane in the nongraphitizable carbon may be preferably 0.37 nm or larger, and a spacing of (002) plane in the graphite may be preferably 0.34 nm or smaller. More specific examples of the carbon material may include pyrolytic carbons, cokes, glassy carbon fibers, an organic polymer compound fired body, activated carbon, and carbon blacks. Examples of the cokes may include pitch coke, needle coke, and petroleum coke. The organic polymer compound fired body is a material that is obtained by firing (carbonizing) a polymer compound such as phenol resin and furan resin at an appropriate temperature. Other than the materials mentioned above, the carbon material may be low crystalline carbon that is subjected to heat treatment at a temperature of about 1000° C. or lower, or may be amorphous carbon. It is to be noted that a shape of the carbon material may be any of a fibrous shape, a spherical shape, a granular shape, and a scale-like shape.

Moreover, the other anode material may be, for example, a material (a metal-based material) that contains one or more of metal elements and metalloid elements as constituent elements. This makes it possible to achieve high energy density. The foregoing high-potential material is excluded from the metal-based material described here.

The metal-based material may be any of a simple substance, an alloy, or a compound, may be two or more thereof, or may have one or more phases thereof in part or all thereof. It is to be noted that the "alloy" also encompasses a material that contains one or more metal elements and one or more metalloid elements, in addition to a material that is configured of two or more metal elements. Further, the "alloy" may contain a nonmetallic element. Examples of a structure of the metal-based material may include a solid solution, a eutectic crystal (a eutectic mixture), an intermetallic compound, and a structure in which two or more thereof coexist.

The metal elements and the metalloid elements described above may be, for example, one or more of metal elements and metalloid elements that are able to form an alloy with lithium. Specific examples thereof may include magnesium, boron, aluminum, gallium, indium, silicon, germanium, tin, lead, bismuth, cadmium, silver, zinc, hafnium, zirconium, yttrium, palladium, and platinum.

In particular, silicon, tin, or both may be preferable. Silicon and tin have superior ability of inserting and extracting lithium, and achieve remarkably-high energy density accordingly.

A material that contains silicon, tin, or both as constituent elements may be any of a simple substance, an alloy, and a compound of silicon, may be any of a simple substance, an alloy, and a compound of tin, may be two or more thereof, or may be a material that has one or more phases thereof at least in part. Note that the "simple substance" described herein merely refers to a simple substance in a general sense (in which a small amount of impurity may be contained), and does not necessarily refer to a simple substance having a purity of 100%.

The alloy of silicon may contain, for example, one or more of elements such as tin, nickel, copper, iron (Fe), cobalt (Co), manganese (Mn), zinc, indium, silver, titanium, germanium, bismuth, antimony (Sb), and chromium (Cr), as constituent elements other than silicon. The compound of silicon may contain, for example, one or more of elements such as carbon (C) and oxygen (O), as constituent elements other than silicon. It is to be noted that the compound of silicon may contain, for example, one or more of the elements described related to the alloy of silicon, as constituent elements other than silicon.

Specific examples of the alloy of silicon and the compound of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, SiC, $Si_3N_4$, $Si_2N_2O$, $SiO_v$ ($0<v\leq2$), and LiSiO. Note that "v" in $SiO_v$ may be in a range of $0.2<v<1.4$.

The alloy of tin may contain, for example, one or more of elements such as silicon, nickel, copper, iron, cobalt, manganese, zinc, indium, silver, titanium, germanium, bismuth, antimony, and chromium, as constituent elements other than tin. The compound of tin may contain, for example, one or more of elements such as carbon and oxygen, as constituent elements other than tin. It is to be noted that the compound of tin may contain, for example, one or more of the elements described related to the alloy of tin, as constituent elements other than tin.

Specific examples of the alloy of tin and the compound of tin may include $SnO_w$ ($0<w\leq2$), $SnSiO_3$, LiSnO, and $Mg_2Sn$.

In particular, the material that contains tin (a first constituent element) as a constituent element may be preferably, for example, a material that contains, together with tin, a second constituent element and a third constituent element. The second constituent element may include, for example, one or more of elements such as cobalt, iron, magnesium, titanium, vanadium (V), chromium, manganese, nickel, copper, zinc, gallium, zirconium, niobium (Nb), molybdenum (Mo), silver, indium, cesium (Ce), hafnium (Hf), tantalum (Ta), tungsten (W), bismuth, and silicon. The third constituent element may include, for example, one or more of elements such as boron, carbon, aluminum, and phosphorus (P). Containing the second constituent element and the third constituent element makes it possible to achieve, for example but not limited to, high battery capacity and superior cycle characteristics.

In particular, a material (a SnCoC-containing material) that contains tin, cobalt, and carbon as constituent elements may be preferable. In the SnCoC-containing material, for example, a content of carbon may be from 9.9 mass % to 29.7 mass % both inclusive, and a ratio of contents of tin and cobalt (Co/(Sn+Co)) may be from 20 mass % to 70 mass % both inclusive. This makes it possible to achieve high energy density.

The SnCoC-containing material may preferably have a phase that contains tin, cobalt, and carbon. Such a phase may be preferably low crystalline or amorphous. This phase is a reaction phase that is able to react with lithium. Hence, existence of the reaction phase results in achievement of superior characteristics. A half width (a diffraction angle 2θ) of a diffraction peak obtained by X-ray diffraction of this reaction phase may be preferably 1° or larger in a case where a CuKα ray is used as a specific X-ray, and an insertion rate is 1°/min. This makes it possible to insert and extract lithium more smoothly, and to decrease reactivity with the electrolytic solution. It is to be noted that, in some cases, the SnCoC-containing material may include a phase that contains simple substances of the respective constituent elements or part thereof in addition to the low-crystalline phase or the amorphous phase.

Whether or not the diffraction peak obtained by the X-ray diffraction corresponds to the reaction phase that is able to react with the electrode reactant is allowed to be easily determined by comparison between X-ray diffraction charts before and after an electrochemical reaction with the electrode reactant. For example, if a position of the diffraction peak after the electrochemical reaction with the electrode reactant is changed from the position of the diffraction peak before the electrochemical reaction with the electrode reactant, the obtained diffraction peak corresponds to the reaction phase that is able to react with the electrode reactant. In this case, for example, the diffraction peak of the low-crystalline reaction phase or the amorphous reaction phase is seen in a range of 2θ that is from 20° to 50° both inclusive. Such a reaction phase may include, for example, the respective constituent elements described above, and it may be considered that such a reaction phase has become low crystalline or amorphous mainly because of existence of carbon.

In the SnCoC-containing material part or all of carbon that is the constituent element thereof may be preferably bonded to a metal element or a metalloid element that is another constituent element thereof. Bonding part or all of carbon suppresses cohesion or crystallization of for example, tin. It is possible to confirm a bonding state of the elements, for example, by X-ray photoelectron spectroscopy (US). In a commercially-available apparatus, for example, an Al—Kα ray or a Mg—Kα ray may be used as a soft X-ray. In a case where part or all of carbon is bonded to a metal element, a metalloid element, or another element, a peak of a synthetic wave of is orbit of carbon (C1s) appears in a region lower than 284.5 eV, it is to be noted that energy calibration is so made that a peak of 4f orbit of a gold atom (Au4f) is obtained at 84.0 eV. In this case, in general, surface contamination carbon exists on the material surface. Hence, a peak of C1s of the surface contamination carbon is regarded to be at 284.8 eV, and this peak is used as energy standard. In XPS measurement, a waveform of the peak of C1s is obtained as a form that includes the peak of the surface contamination carbon and the peak of the carbon in the SnCoC-containing material. The two peaks may be therefore separated from each other, for example, by analysis with use of commercially-available software. In the analysis of the waveform, a position of the main peak that exists on the lowest hound energy side is regarded as the energy standard (284.8 eV).

The SnCoC-containing material is not limited to a material (SnCoC) that contains only tin, cobalt, and carbon as constituent elements. The SnCoC-containing material may further contain, for example, one or more of silicon, iron, nickel, chromium, indium, niobium, germanium, titanium, molybdenum, aluminum, phosphorus, gallium, bismuth, and other elements, as constituent elements, in addition to tin, cobalt, and carbon.

Other than the SnCoC-containing material, a material (a SnCoFeC-containing material) that contains tin, cobalt, iron, and carbon as constituent elements may be also preferable.

Any composition of the SnCoFeC-containing material may be adopted. To give an example, in a case where a content of iron is set smaller, a content of carbon may be from 9.9 mass % to 29.7 mass % both inclusive, the content of iron may be from 0.3 mass % to 5.9 mass % both inclusive, and a ratio of contents of tin and cobalt (Co/(Sn+Co)) may be from 30 mass % to 70 mass % both inclusive. Alternatively, in a case where the content of iron is set larger, the content of carbon may be from 11.9 mass % to 29.7 mass % both inclusive, the ratio of contents of tin, cobalt, and iron ((Co+Fe)/(Sn+Co+Fe)) may be from 26.4 mass % to 48.5 mass % both inclusive, and the ratio of contents of cobalt and iron (Co/(Co+Fe)) may be from 9.9 mass % to 79.5 mass % both inclusive. Such composition ranges allow for achievement of high energy density. It is to be noted that physical characteristics (such as a half width) of the SnCoFeC-containing material are similar to physical characteristics of the foregoing SnCoC-containing material.

Other than the materials mentioned above, the anode material may be, for example, one or more of a metal oxide, and a polymer compound. Examples of the metal oxide may include iron oxide, ruthenium oxide, and molybdenum oxide. Examples of the polymer compound may include polyacetylene, polyaniline, and polypyrrole.

The anode binder may include, for example, one or more of synthetic rubbers and polymer materials. Examples of the synthetic rubber may include styrene-butadiene-based rubber, fluorine-based rubber, and ethylene propylene diene. Examples of the polymer material may include polyvinylidene fluoride and polyimide.

The anode conductor may include, for example, one or more of carbon materials. Examples of the carbon material may include graphite, carbon black, acetylene black, and Ketjen black. However, the cathode conductor may be a metal material, a conductive polymer, or any other material, as long as the cathode conductor is a material having conductivity.

The anode active material layer 2 may be formed, for example, by one or more of a coating method, a firing method (a sintering method), and other methods. The coating method may be, for example, a method in which, after a particulate (powder) anode active material is mixed with, for example, an anode binder, the mixture is dispersed in a solvent such as an organic solvent, and the resultant is applied onto the anode current collector 1. The firing method may be, for example, a method in which, after the mixture dispersed in the solvent is applied onto the anode current collector 1 by the coating method, the resultant is subjected to heat treatment at a temperature higher than a melting point of for example, the anode binder. For example, one or more of an atmosphere firing method, a reactive firing method, a hot press firing method, and other firing methods may be employed as the firing method.

The metal salt may contain one or both of a carboxylic acid compound represented by the following formula (1) and a sulfonic acid compound represented by the following formula (2). Note that hereinafter simply called "metal salt" is a generic term for the carboxylic acid compound and the sufone-type compound.

[Chem. 3]

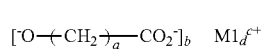 (1)

where M1 is one of an alkali metal element and an alkali-earth metal element, "a" is an integer of 1 or larger, each of "b", "c", and "d" is 1 or 2, and in a case of d=2, one M1 and the other M1 max be of a same kind or different kinds.

[Chem. 4]

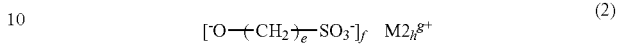 (2)

where M2 is one of an alkali metal element and an alkali-earth metal element, "e" is an integer of 1 or larger, each of "f", "g", and "h" is 1 or 2, and in a case of h=2, one M1 and the other M2 may be of a same kind or different kinds.

The carboxylic acid compound is a salt containing a carboxylate ion group (—C(=O)—O—) in an anion.

The kind of M1 is not specifically limited, as long as M1 is one of the alkali metal element and the alkali-earth metal element. Non-limiting examples of the alkali metal element may include lithium, sodium (Na), potassium (K), rubidium (Rb), and cesium. Non-limiting examples of the alkali-earth metal elements may include beryllium (Be), magnesium, calcium (Ca), strontium (Sr), and barium (Ba).

The value of "a" that represents the number of repetitions of a methylene group (—CH$_2$—) is not specifically limited, as long as the value of "a" is an integer of 1 or larger. The value of "b" that represents the number of anions is not specifically limited, as long as the value of "b" is 1 or 2. Details of "c" that represents a valence of a cation and "d" that represents the number of cations are similar to the details of "b". The respective values of "b" to "d" are determined depending on the kind of M1 (the alkali metal element or the alkali-earth metal element).

In the case of d=2, two M1s are present. In this case, one M1 and the other M1 may be of a same kind or different kinds. The case where two M1s are of the same kind may include, for example but not limited to, a case where the two M1s are both lithium. The case where the two M1s are of different kinds may include, for example but not limited, a case where one M1 is lithium and the other M1 is sodium.

The suffonic acid compound is a salt containing a sulfonate ion group (—S(=O)$_2$—O$^-$) in an anion. Details of M2, "e", "f", "g", and "h" are similar to the details of M1, "a", "b", "c", and "d" described above. Accordingly, in a case of h=2, one M2 and the other M2 may be of a same kind or different kinds.

The anode active material layer 2 may contain the metal salt together with the anode active material (high-potential material). A synergistic effect of the high potential material and the metal salt allows for an improvement in chemical stability of the anode during charge and discharge. Even if charge and discharge are repeated, the synergistic effect suppresses decomposition reaction of the electrolytic solution caused by reactivity of the anode, and suppresses gas generation resulting from the decomposition reaction of the electrolytic solution. These advantages are noticeable specifically in a case where the secondary battery using the anode is used or stored in a high-temperature environment.

In particular, the value of "a" may be preferably an integer of 1 to 5 both inclusive, and more preferably an integer of 1 to 4 both inclusive. Such a value allows for further improvement in chemical stability of the anode during charge and discharge.

The kind of M1 may be preferably the alkali metal element, which allows for further improvement in chemical stability of the anode during charge and discharge. More specifically, M1 may be preferably lithium. The carboxylic acid compound is able to function as a lithium supply source, thereby achieving a higher effect.

Note that one M1 and the other M1 may be preferably of a same kind. This makes it possible to achieve a higher effect.

Details of "e" and M2 are respectively similar to the details of "a" and M1.

Specific examples of the carboxylic acid compound may include the following compounds. The following specific examples are merely examples of the carboxylic acid compound, and may include compounds other than the following compounds.

Examples of the compound in a case of a=1 may include $LiO-CH_2-CO_2Li$, $NaO-CH_2-CO_2Na$, $KO-CH_2-CO_2K$, $LiO-CH_2-O_2Na$, $LiO-CH_2CO_2K$, $NaO-CH_2-CO_2K$, $[O-CH_2-CO_2]Mg$, and $[O-CH_2-CO_2]Ca$.

Examples of the compound in a case of a=2 may include $LiO-C_2H_4-CO_2Li$, $NaO-C_2H_4-CO_2Na$, $KO-C_2H_4-CO_2K$, $LiO-C_2H_4-CO_2Na$, $LiO-C_2H_4-CO_2K$, $NaO-C_2H_4-CO_2K$, $[O-C_2H_4-CO_2]Mg$, and $[O-C_2H_4-CO_2]Ca$.

Examples of the compound in a case of a=3 may include $LiO-C_3H_6-CO_2Li$, $NaO-C_3H_6-CO_2Na$, $KO-C_3H_6-CO_2K$, $LiO-C_3H_6-CO_2Na$, $LiO-C_3H_6-CO_2K$, $NaO-C_3H_6-CO_2K$, $[O-C_3H_6-CO_2]Mg$, and $[O-C_3H_6-CO_{21}]Ca$.

Examples of the compound in a case of a=4 may include $LiO-C_4H_8-CO_2Li$, $NaO-C_4H_8-CO_2Na$, $KO-C_4H_8-CO_2K$, $LiO-C_4H_8-CO_2Na$, $LiO-C_4H_8-CO_2K$, $NaO-C_4H_8-CO_2K$, $[O-C_4H_8-CO_2]Mg$, and $[O-C_4H_8-CO_2]Ca$.

Examples of the compound in a case of a=5 may include $LiO-C_5H_{10}-CO_2Li$, $NaO-C_5H_{10}-CO_2Na$, $KO-C_5H_{10}-CO_2K$, $LiO-C_5H_{10}-C O_2Na$, $LiO-C_5H_{10}-CO_2K$, $NaO-C_5H_{10}-CO_2K$, $[O-C_5H_{10}-CO_2]Mg$, and $[O-C_5H_{10}-CO_2]Ca$.

Specific examples of the sulfonic acid compound may include the following compounds. The following specific examples are merely examples of the sulfonic acid compound, and may include compounds other than the following compounds.

Examples of the compounds in a case of e=1 may include $LiO-CH_2-SO_3Li$, $NaO-CH_2-SO_3Na$, $KO-CH_2-SO_3K$, $LiO-CH_2-SO_3Na$, $LiO-CH_2-SO_3K$, and $NaO-CH_2-SO_3K$.

Examples of the compounds in a case of e=2 may include $LiO-C_2H_4-SO_3Li$, $NaO-C_2H_4-SO_3Na$, $KO-C_2H_4-SO_3K$, $LiO-C_2H_4-SO_3Na$, $LiO-C_2H_4SO_3K$, and $NaO-CH_2-SO_2K$.

Examples of the compounds in a case of e=3 may include $LiO-C_3H_6-SO_3Li$, $NaO-C_3H_6-SO_3Na$, $KO-C_3H_6-SO_3K$, $LiO-C_3H_6-SO_3Na$, $LiO-C_3H_6-SO_3K$, and $NaO-C_2H_6-SO_3K$.

Examples of the compounds in a case of e=4 may include $LiO-C_4H_8-SO_3Li$, $NaO-C_4H_2-SO_3Na$, $KO-C_4H_8-SO_3K$, $LiO-C_4H_8-SO_3Na$, $LiO-C_4H_8-SO_3K$, and $NaO-C_4H_8-SO_3K$.

Examples of the compounds in a case of e=5 may include $LiO-C_5H_{10}-SO_3Li$, $NaO-C_5H_{10}-SO_3Na$, $KO-C_5H_{10}-SO_3K$, $LiO-C_5H_{10}-SO_3Na$, $LiO-C_5H_{10}-SO_3K$, and $NaO-C_5H_{10}SO_3K$.

A content of the metal salt in the anode active material layer 2 is not specifically limited, but may be preferably from 0.1 wt % to 5 wt % both inclusive, and more preferably from 0.5 wt % to 3 wt % both inclusive. This makes it possible to achieve the foregoing synergistic effect without reducing the content of the anode active material relatively excessively, thereby achieving a higher effect.

[Method of Manufacturing Anode]

The anode may be manufactured by the following procedure, for example.

First, the anode active material containing the high-potential material, the metal salt containing one or both of the carboxylic acid compound and the sulfonic acid compound, and, on as-necessary basis, for example, an anode binder and an anode conductor are mixed to obtain an anode mixture. Subsequently, the anode mixture is dispersed in, for example, an organic solvent to obtain paste anode mixture slurry. Lastly, the anode mixture slurry is applied onto both surfaces of the anode current collector 1, and the applied anode mixture slurry is dried to form the anode active material layers 2. Thereafter, on as-necessary basis, the anode active material layers 2 may be compression-molded with use of, for example, a roll pressing machine. In this case, the anode active material layers 2 may be compression-molded while being heated, or may be compression-molded a plurality of times. Thus, the anode is completed.

[Functions and Effects of Secondary Battery-use Anode]

Since the anode includes the anode active material (high-potential material) and the metal salt together, as described above, the synergistic effect of the high-potential material and the metal salt allows for an improvement in chemical stability of the anode during charge and discharge. Even if charge and discharge are repeated, the synergistic effect suppresses decomposition reaction of the electrolytic solution caused by reactivity of the anode, and suppresses gas generation resulting from the decomposition reaction of the electrolytic solution. This makes it possible to improve battery characteristics of the secondary battery using the anode.

In particular, when the value of "a" in the formula (1) relating to the carboxylic acid compound is an integer of 1 to 5 both inclusive, or when M1 in the formula (1) is the alkali metal element (lithium in particular), a higher effect is achievable. Moreover, when the value of "e" in the formula (2) relating to the sulfonic acid compound is an integer of 1 to 5 both inclusive, or when M2 in the formula (2) is the alkali metal element (lithium in particular), a higher effect is achievable.

Further, when the high-potential material contains the compound represented by the formula (3), a higher effect is achievable.

When the content of the metal salt in the anode active material layer 2 is from 0.5 wt % to 3 wt % both inclusive, a higher effect is achievable.

(2. Secondary Battery Using Secondary Battery-Use Anode)

Next, description is given of a secondary battery using the anode according to the embodiment of the technology.

(2-1. Cylindrical Type)

FIGS. 2 and 3 each illustrate a sectional configuration of the secondary battery. FIG. 3 illustrates an enlarged view of part of a spirally wound electrode body 20 illustrated in FIG. 2.

[Configuration of Secondary Battery]

The secondary battery described here is a secondary battery (a lithium ion secondary battery) in which capacity of an anode 22 is obtained by insertion and extraction of lithium that is an electrode reactant. In description below, the components of the anode of the technology that has been already described are used where appropriate.

The secondary battery may be, for example, a so-called cylindrical type secondary battery, which may contain the spirally wound electrode body 20 and a pair of insulating plates 12 and 13 inside a battery can 11 that has a hollow cylindrical shape. In the spirally wound electrode body 20, for example, the cathode 21 and the anode 22 may be stacked with a separator 23 in between and may be spirally wound.

The battery can 11 may have, for example, a hollow structure in which one end of the battery can 11 is closed and the other end of the battery can 11 is open. The battery can 11 may be made of for example, iron, aluminum, an alloy thereof, or any other material. A surface of the battery can 11 may be plated with, for example, nickel S. The pair of insulating plates 12 and 13 is so disposed as to sandwich the spirally wound electrode body 20 in between and extend perpendicularly to a spirally wound periphery surface of the spirally wound electrode body 20.

At the open end of the battery can 11, a battery cover 14, a safety valve mechanism 15, and a positive temperature coefficient device (PTC device) 16 are swaged with a gasket 17, by which the battery can 11 is hermetically sealed. The battery cover 14 may be made of, for example, a material similar to the material of the battery can 11. Each of the safety valve mechanism 15 and the PTC device 16 is provided on the inner side of the battery cover 14, and the safety valve mechanism 15 is electrically coupled to the battery cover 14 via the PTC device 16. In the safety valve mechanism 15, when an internal pressure of the battery can 11 reaches a certain level or higher as a result of for example, internal short circuit or heating from outside, a disk plate 15A inverts. This cuts electric connection between the battery cover 14 and the spirally wound electrode body 20. In order to prevent abnormal heat generation resulting from a large current, resistance of the PTC device 16 increases as a temperature rises. The gasket 17 may be made of for example, an insulating material. A surface of the gasket 17 may be coated with asphalt.

In the center of the spirally wound electrode body 20, a center pin 24 may be inserted. However, the center pin 24 may not be inserted in the center of the spirally wound electrode body 20. A cathode lead 25 made of, for example, a conductive material such as aluminum may be coupled to the cathode 21, and an anode lead 26 made of for example, a conductive material such as nickel may be coupled to the anode 22. The cathode lead 25 may be attached to the safety valve mechanism 15 by, for example, welding, and may be electrically coupled to the battery cover 14. The anode lead 26 may be attached to the battery can 11 by, for example, welding and may be electrically coupled to the battery can 11.

[Cathode]

As illustrated in FIG. 2, the cathode 21 may include a cathode current collector 21A and a cathode active material layer 21B that may be provided on a single surface or both surfaces of the cathode current collector 21A. The cathode current collector 21A may be made of, for example, a conductive material such as aluminum, nickel S, and stainless steel.

The cathode active material layer 21B may include, as a cathode active material, one or more of cathode materials that have ability to insert and extract lithium. It is to be noted that the cathode active material layer 21B may further include one or more of other materials such as a cathode binder and a cathode conductor. Details of the cathode binder and the cathode conductor are similar to details of the anode binder and the anode conductor described above.

The cathode material may be preferably a lithium-containing compound. The lithium-containing compound allows for achievement of high energy density. Examples of the lithium-containing compound may include a lithium transition metal composite oxide and a lithium transition metal phosphate compound. The lithium transition metal composite oxide is an oxide containing lithium and one or more transition elements as constituent elements, and the lithium transition metal phosphate compound is a phosphate compound containing lithium and one or more transition metal element as constituent elements. In particular, the one or more transition metal elements may be preferably one or more of cobalt, nickel, manganese, iron, and other metal elements. These transition metal elements make it possible to obtain a higher voltage. A chemical formula of the lithium-containing compound may be represented by, for example, $Li_xM1O_2$ or $Li_yM2PO_4$. In the formulas, each of M1 and M2 is one or more of the transition metal elements. The values of "x" and "y" vary according to charge and discharge states, but may be, for example, $0.05 \leq x \leq 1.10$ and $0.05 \leq y \leq 1.10$.

Specific examples of the lithium transition metal composite oxide may include $LiCoO_2$, $LNiO_2$, and a lithium-nickel-based composite oxide represented by the following formula (20). Specific examples of lithium transition metal phosphate may include $LiFePO_4$ and $LiFe_{1-u}Mn_uPO_4$ (where u<1). These lithium transition metal composite oxides and these lithium transition metal phosphates make it possible to achieve higher battery capacity and to achieve superior cycle characteristics.

$$LiNi_{1-z}M_zO_2 \tag{20}$$

where M is one or more of cobalt, manganese, iron, aluminum, vanadium, tin, magnesium, titanium, strontium, calcium, zirconium, molybdenum, technetium (Tc), ruthenium (Ru), tantalum, tungsten, rhenium (Re), ytterbium (Yb), copper, zinc, barium, boron, chromium, silicon, gallium, phosphorus, antimony, and niobium, and "z" satisfies $0.005 < z < 0.5$.

In addition thereto, the cathode material may include, for example, one or more of an oxide, a disulfide, a chalcogenide, and a conductive polymer. Examples of the oxide may include titanium oxide, vanadium oxide, and manganese dioxide. Examples of the disulfide may include titanium disulfide and molybdenum sulfide. Examples of the chalcogenide may include niobium selenide. Examples of the conductive polymer may include sulfur, polyaniline, and polythiophene. However, the cathode material may be a material other than the foregoing materials.

[Anode]

The anode 22 may include an anode current collector 22A and a cathode active material layer 22B that may be provided on a single surface or both surfaces of the anode current collector 22A The configurations of the anode current collector 22A and the anode active material layer 22B are respectively similar to the configurations of the anode current collector 1 and the anode active material layer 2.

In order to prevent lithium metal from being unintentionally precipitated on the anode 22 in the middle of charge, chargeable capacity of the anode material may be preferably larger than discharge capacity of the cathode 21, in other words, electrochemical equivalent of the anode material that has ability to insert and extract lithium may be preferably larger than electrochemical equivalent of the cathode 21.

In the secondary battery, in a case where an open circuit voltage (that is, a battery voltage) in a completely-charged state is 4.25 V or higher, an extraction amount of lithium per unit mass is larger than that in a case where the open circuit voltage is 4.2 V, even if the same cathode active material is used. Hence, amounts of the cathode active material and the anode active material are adjusted in accordance therewith. As a result, high energy density is achieved.

[Separator]

The separator 23 separates the cathode 21 from the anode 22, and passes lithium ions therethrough while preventing current short circuit that results from contact between the cathode 21 and the anode 22. The separator 23 may be, for example, a porous film that is made of for example, a synthetic resin or ceramics. The separator 23 may be a laminated film in which two or mere porous films are laminated. Examples of the synthetic resin may include polytetrafluoroethylene, polypropylene, and polyethylene.

In particular, the separator 23 may include, for example, the foregoing porous film (a base material layer), and a polymer compound layer provided on a single surface or both surfaces of the base material layer. This allows for an improvement in adhesibility of the separator 23 with respect to each of the cathode 21 and the anode 22, thereby suppressing deformation of the spirally wound electrode body 20. This makes it possible to suppress decomposition reaction of the electrolytic solution and to suppress liquid leakage of the electrolytic solution with which the base material layer is impregnated. As a result, even if the secondary battery is charged and discharged repeatedly, resistance is less likely to be increased, and battery swollenness is suppressed.

The polymer compound layer may include, tor example, a polymer material such as polyvinylidene fluoride. Such a polymer material has superior physical strength and is electrochemically stable. However, the polymer material may be a material other than polyvinylidene fluoride. When forming the polymer compound layer, for example, a solution in which the polymer material is dissolved is prepared, and thereafter, the solution is applied onto the base material layer, and the base material layer is subsequently dried. Alternatively, the base material layer may be soaked into the solution and may be subsequently dried.

[Electrolytic Solution]

The separator 23 is impregnated with the electrolytic solution that is a liquid electrolyte, and the electrolytic solution contains a solvent and an electrolyte salt. The electrolytic solution may contain one or more of other materials such as an additive.

The solvent contains one or more of nonaqueous solvents such as an organic solvent. An electrolytic solution containing the nonaqueous solvent is a so-called nonaqueous electrolytic solution.

Examples of the nonaqueous solvents may include a cyclic ester carbonate, a chain ester carbonate, lactone, a chain carboxylic ester, and nitrile. Such nonaqueous solvents make it possible to achieve, for example, superior battery capacity, superior cycle characteristics, and superior storage characteristics. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methylpropyl carbonate. Examples of the lactone may include γ-butyrolactone and γ-valerolactone. Examples of the carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoacetonitrile, and 3-methoxypropionitrile.

In addition thereto, examples of the nonaqueous solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, or dimethyl sulfoxide. These nonaqueous solvents make it possible to obtain similar advantages.

In particular, one or more of ethylene carbonate, propylene carbonate, dimethyl carbonate, diethyl carbonate, and ethyl methyl carbonate may be preferable. These materials make it possible to achieve, for example, further superior battery capacity, further superior cycle characteristics, and further superior storage characteristics. In this case, a combination of a high-viscosity (high dielectric constant) solvent (having, for example, specific dielectric constant $\varepsilon \geq 30$) and a low-viscosity solvent (having, for example, viscosity $\leq 1$ mPa·s) may be more preferable. Examples of the high-viscosity solvent may include ethylene carbonate and propylene carbonate, and examples of the low-viscosity solvent may include dimethyl carbonate, ethylmethyl carbonate, and diethyl carbonate. The combination allows for an improvement in the dissociation property of the electrolyte salt and ion mobility.

Moreover, γ-butyrolactone may be preferable. This makes it possible to suppress decomposition reaction of the electrolytic solution, thereby suppressing gas generation resulting from the decomposition reaction of the electrolytic solution. A content of γ-butyrolactone in the solvent is not specifically limited, but may be preferably 20 wt % or greater, and more preferably from 20 wt % to 50 wt % both inclusive. A higher effect is achievable in this range.

In particular, the solvent may preferably contain one or more of for example but not limited to, an unsaturated cyclic ester carbonate, a halogenated ester carbonate, sultone (cyclic sulfonic ester), and acid anhydride. This allows for an improvement in chemical stability of the electrolytic solution. The unsaturated cyclic ester carbonate is a cyclic ester carbonate including one or more unsaturated carbon bonds (carbon carbondouble bonds). Examples of the unsaturated cyclic ester carbonate may include vinylene carbonate, vinylethylene carbonate, and methyleneethylene carbonate. The halogenated ester carbonate is a cyclic ester carbonate having one or more halogens as constituent elements or a chain ester carbonate having one or more halogens as constituent elements. Examples of the cyclic halogenated ester carbonate may include fluoro-1,3-dioxolane-2-one and 4,5 difluoro-1,3-dioxolane-2-one. Examples of the chain halogenated ester carbonate may include fluoro methyl carbonate, bis(fluoromethyl) carbonate, and difluoromethyl methyl carbonate. Examples of the sultone may include propane sultone and propene sultone. Examples of the acid anhydrides may include a succinic anhydride, an ethane disulfonic anhydride, and a suffobenzoic anhydride. However, the solvent is not limited to the foregoing materials, and may be a material other than the foregoing materials.

The electrolyte salt may contain, for example, one or more of salts such as a lithium salt. However, the electrolyte salt may contain a salt other than the lithium salt. Examples of the salt other than the lithium salt may include a light metal salt other than the lithium salt.

Examples of the lithium salt may include lithium hexafluorophosphate (LiPF$_6$), lithium tetrafluoroborate (LiBF$_4$), lithium perchlorate (LiClO$_4$), lithium hexafluoroarseuate (LiAsF$_6$), lithium tetraphenylborate (LiB(C$_6$H$_5$)$_4$), lithium methanesulfonate (LiCH$_3$SO$_3$), lithium trifluoromethane sulfonate (Li$_2$SiF$_6$), lithium tetrachloroaluminate (LiAlCl$_4$), dilithium hexafluorosilicate (Li$_2$SiF$_6$), lithium chloride (LiCl), and lithium bromide (LiBr). These lithium salts make it possible to achieve, for example, superior battery capacity, superior cycle characteristics, and superior storage characteristics.

In particular, one or more of LiPF$_6$, LiBF$_4$, LiClO$_4$, and LiAsF$_6$ may be preferable, and LiPF$_6$ may be more preferable. These lithium salts make it possible to lower internal resistance, thereby achieving a higher effect. However, the electrolyte salt is not limited to the foregoing materials, and may be a material other than the foregoing materials.

A content of the electrolyte salt is not specifically limited, but in particular, may be preferably from 0.3 mol/kg to 3.0 mol/kg both inclusive with respect to the solvent. High ion conductivity is achievable in this range.

[Operation of Secondary Battery]

The secondary battery may operate, for example, as follows. When the secondary battery is charged, lithium ions are extracted from the cathode 21, and the extracted lithium ions are inserted in the anode 22 through the electrolytic solution. When the secondary battery is discharged, lithium ions are extracted from the anode 22, and the extracted lithium ions are inserted in the cathode 21 through the electro solution.

[Method of Manufacturing Secondary Battery]

The secondary battery may be manufactured by the following procedure, for example.

When fabricating the cathode 21, first, the cathode active material is mixed with, for example but not limited to, the cathode binder to obtain a cathode mixture. Subsequently, the cathode mixture is dispersed in, for example, an organic solvent to obtain paste cathode mixture slurry. Lastly, the cathode mixture slurry is applied onto both surfaces of the cathode current collector 21A, and the applied cathode mixture slurry is dried to form the cathode active material layers 21B. Thereafter, the cathode active material layers 21B may be compression-molded with use of for example, a roll pressing machine. In this case, the cathode active material layer 21B may be compression-molded while being heated, or may be compression-molded a plurality of times.

When fabricating the anode 22, the anode active material layer 22B is formed on both surfaces of the anode current collector 22A by a similar manufacturing procedure to the manufacturing procedure in the anode of the technology.

When assembling the secondary battery, the cathode lead 25 is attached to the cathode current collector 21A by, for example, a welding method, and the anode lead 26 is attached to the anode current collector 22A by, for example, a welding method. Subsequently, the cathode 21 and the anode 22 are stacked with the separator 23 in between, and the resultant stacked body is spirally wound to form the spirally wound electrode body 20. Thereafter, the center pin 24 is inserted in the center of the spirally wound electrode body 20. Subsequently, the spirally wound electrode body 20 is sandwiched between the pair of insulating plates 12 and 13, and is contained inside the battery can 11. In this case, a tip of the cathode lead 25 is attached to the safety valve mechanism 15 by, for example, a welding method, and a tip of the anode lead 26 is attached to the battery can 11 by, for example, a welding method. Subsequently, the electrolytic solution prepared by dispersing the electrolyte salt in the solvent is injected inside the battery can 11, and the separator 23 is impregnated with the injected electrolytic solution. Lastly, the battery cover 14, the safety valve mechanism 15, and the PTC device 16 are swaged with the gasket 17 at the open end of the battery can 11.

[Functions and Effects of Secondary Battery]

According to the cylindrical secondary battery, the anode 22 has a similar configuration to the configuration of the anode of the technology. Such a configuration allows for an improvement in chemical stability of the anode 22 during charge and discharge, which makes it possible to suppress the decomposition reaction of the electrolytic solution caused by the reactivity of the anode 22, and to suppress gas generation resulting from the decomposition reaction of the electrolytic solution. Thus, superior battery characteristics are achievable. Functions and effects other than those described above are similar to those of the anode of the technology.

(2-2. Laminated Film Type)

FIG. 4 illustrates a perspective exploded configuration of another secondary battery according to an embodiment of the technology. FIG. 5 illustrates an enlarged sectional view taken along line V-V of a spirally wound electrode body 30 illustrated in FIG. 4. In description below, the components of the cylindrical type secondary battery that has been already described are used where appropriate.

[Configuration of Secondary Battery]

The secondary battery described below is a so-called laminated film type secondary battery. In the secondary battery, the spirally wound electrode body 30 may be contained inside a film-like outer package member 40. In the spirally wound electrode body 30, a cathode 33 and an anode 34 may be stacked with a separator 35 and an electrolyte layer 36 in between, and the cathode 33, the resultant stacked body run be spirally wound. A cathode lead 31 is attached to the cathode 33, and an anode lead 32 is attached to the anode 34. An outermost periphery of the spirally wound electrode body 30 is protected by a protective tape 37.

Each of the cathode lead 31 and the anode lead 32 may be led out from inside to outside of the outer package member 40 in a same direction, for example. The cathode lead 31 may be made of for example, a conductive material such as aluminum. The anode lead 32 may be made of for example, a conductive material such as copper, nickel, and stainless steel. These conductive materials may have a thin-plate shape or a mesh shape, for example.

The outer package member 40 may be a laminated film in which a fusion bonding layer, a metal layer, and a surface protective layer are laminated in this order, for example. Two laminated films are stacked so that the fusion bonding layers thereof are opposed to the spirally wound electrode body 30 and outer edges of the fusion bonding layer are fusion-bonded. However, the two laminated films may be bonded to each other by, for example, an adhesive. Examples of the fusion bonding layer may include a film made of one or more of polyethylene, polypropylene, and other materials. Examples of the metal layer may include an aluminum foil. Examples of the surface protective layer may include a film made of one or more of nylon, polyethylene terephthalate, and other materials.

In particular, the outer package member 40 may be preferably an aluminum laminated film in which the polyethylene film, the aluminum foil, and the nylon film are laminated in this order. However, the outer package member 40 may be a laminated film having any other laminated structure, a polymer film made of a polymer such as polypropylene, or a metal film.

For example, an adhesive film 41 may be inserted between the outer package member 40 and the cathode lead 31 and between the outer package member 40 and the anode lead 32 in order to prevent outside air intrusion. The adhesive film 41 may be made of a material having adhesibility with respect to the cathode lead 31 and the anode lead 32. The material having such adhesibility may be, for example, one or more of polyolefin resins such as polyethylene, polypropylene, modified polyethylene, and modified polypropylene.

The cathode 33 may include, for example, a cathode current collector 33A and a cathode active material layer 33B that may be provided on a single surface or both surfaces of the cathode current collector 33A. The anode 34 may include, for example, an anode current collector 34A and an anode active material layer 34B that may be provided on a single surface or both surfaces of the anode current collector 34A. The configurations of the cathode c anent collector 33A, the cathode active material layer 33B, the anode current collector 34A, and the anode active material layer 34B are respectively similar to the configurations of the cathode current collector 21A, the cathode active material layer 21B, the anode current collector 22A, and the anode active material layer 22B. The configuration of the separator 35 is similar to the configuration of the separator 23.

The electrolyte layer 36 includes, together with an electrolytic solution, a polymer compound holding the electrolytic solution. The electrolyte layer 36 is a so-called gel electrolyte, by which high ion conductivity (for example, 1 mS/cm or more at room temperature) is achieved and liquid leakage of the electrolytic solution is prevented. The electrolyte layer 36 may further include, in addition to the electrolytic solution and the polymer compound, one or more of other materials such as an additive.

The polymer compound may include, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethylmethacrylate, polyacrylic acid, polymethacrylic acid, styrene-butadiene rubber, nitrile-butadiene rubber, polystyrene, polycarbonate, and a copolymer of vinylidene fluoride and hexafluoropylene. In particular, polyvinylidene fluoride or the copolymer of vinylidene fluoride and hexafluoropylene may be preferable, and polyvinylidene fluoride may be more preferable. Such polymers are electrochemically stable.

For example, the composition of the electrolytic solution may be similar to the composition of the electrolytic solution of the cylindrical type secondary battery. However, in the electrolyte layer 36 that is a gel electrolyte, the solvent included in the electrolytic solution refers to a wide concept that encompasses not only a liquid solvent but also a material having ion conductivity that has ability to dissociate the electrolyte salt. Hence, in a case where a polymer compound having ion conductivity is used, the polymer compound is also encompassed by the solvent.

It is to be noted that the electrolytic solution may be used as it is instead of the gel electrolyte layer 36. In this case, the separator 35 is impregnated with the electrolytic solution.

[Operation of Secondary Battery]

The secondary battery may operate, for example, as follows. When the secondary battery is charged, lithium ions are extracted from the cathode 33, and the extracted lithium ions are inserted in the anode 34 through the electrolyte layer 36. When the secondary battery is discharged, lithium ions are extracted from the anode 34, and the extracted lithium ions are inserted in the cathode 33 through the electrolyte layer 36.

[Method of Manufacturing Secondary Battery]

The secondary battery that includes the gel electrolyte layer 36 may be manufactured by the following three kinds of procedures, for example.

In the first procedure, the cathode 33 and the anode 34 are fabricated by a fabrication procedure similar to the procedure of fabricating the cathode 21 and the anode 22. In this case, the cathode active material layers 33B are thrilled on both surfaces of the cathode current collector 33A to fabricate the cathode 33, and the anode active material layers 34B are forrred on both surfaces of the anode current collector 34A to fabricate the anode 34. Subsequently, the electrolytic solution the polymer compound, and a solvent such as an organic solvent are mixed to prepare a precursor solution Subsequently, the precursor solution is applied onto each of the cathode 33 and the anode 34 to form the gel electrolyte layer 36. Subsequently, the cathode lead 31 is attached to the cathode current collector 33A by, for example, a welding method, and the anode lead 32 is attached to the anode current collector 34A by, for example, a welding method. Subsequently, the cathode 33 and the anode 34 are stacked with the separator 35 in between, and the resultant stacked body is spirally wound to tour the spirally wound electrode body 30. Thereafter, the protective tape 37 is attached onto the outermost periphery of the spirally wound body 30. Subsequently, after the spirally wound electrode body 30 is sandwiched between two film-like outer package members 40, the outer edges of the outer package members 40 are bonded to each other by, for example, a thermal fusion bonding method to enclose the spirally wound electrode body 30 between the outer package members 40. In this case, the adhesive films 41 are inserted between the cathode lead 31 and the outer package member 40 and between the anode lead 32 and the otter package member 40.

In the second procedure, the cathode lead 31 is attached to the cathode 33, and the anode lead 32 is attached to the anode 34. Subsequently, the cathode 33 and the anode 34 are stacked with the separator 35 in between, and are spirally wound to fabricate a spirally wound body that is a precursor of the spirally wound electrode body 30. Thereafter, the protective tape 37 is attached onto the outermost periphery of the spirally wound body. Subsequently, after the spirally wound body is sandwiched between two film-like outer package members 40, the outer edges except for outer edges on one side of the outer package members 40 are bonded by, for example, a thermal fusion bonding method to contain the spirally wound body inside a pouch formed of the outer package members 40. Subsequently, the electrolytic solution, monomers that are raw materials of the polymer compound, a polymerization initiator, and, on as-necessary basis, other materials such as a polymerization inhibitor are mixed to prepare a composition for electrolyte. Subsequently, the composition for electrolyte is injected inside the pouch formed of the outer package members 40. Thereafter, the pouch formed of the outer package members 40 is hermetically sealed by, for example, a thermal fusion bonding method. Subsequently, the monomers are thermally polymerized to form the polymer compound. The gel electrolyte layer 36 is thereby formed.

In the third procedure, the spirally wound body is fabricated and contained inside the pouch formed of the outer package members 40 in a similar manner to that of the second procedure described above, except that the separator 35 with both surfaces coated with a polymer compound is used. Examples of the polymer compound with which the separator 35 is coated may include a polymer (a homopolymer or a copolymer) containing vinylidene fluoride as a component. Examples of the copolymer may include polyvinyliden fluoride, a binary copolymer containing vinylidene fluoride and hexafluoropropylene as components, and a ternary copolymer containing vinylidene fluoride, hexafluoropropylene, and chlorotrifluoroethylene as components. It is to be noted that, one or more of other polymer compounds may be used together with the polymer containing vinylidene fluoride as a component. Subsequently, the electrolytic solution is prepared and injected inside the pouch formed of the outer package members 40. Thereafter, an opening of the pouch formed of the outer package members 40 is hermetically sealed by, for example, a thermal fusion bonding method. Subsequently, the resultant is heated while a weight is applied to the outer package members 40 to allow the separator 35 to be closely attached to the cathode 33 with the polymer compound in between and allow the separator 35 to be closely attached to the anode 34 with the polymer compound in between Thus, the polymer compound is impregnated with the electrolytic solution, and the polymer compound is gelated. The electrolyte layer 36 is thereby formed.

In the third procedure, swollenness of the secondary battery is suppressed more than in the first procedure. Further, in the third procedure, for example, the monomers the raw materials of the polymer compound) and the solvent are hardly left in the electrolyte layer 36, compared to in the second procedure. Accordingly, the formation process of the polymer compound is favorably controlled. As a result, each of the cathode 33, the anode 34, and the separator 35 is sufficiently and closely attached to the electrolyte layer 36.

[Functions and Effects of Secondary Battery]

According to the laminated film type secondary battery, the anode 34 has a similar configuration to the configuration of the anode of the technology. For a similar reason to the reason in the cylindrical type secondary battery, such a configuration makes it possible to suppress decomposition reaction of the electrolytic solution caused by reactivity of the anode 34 and suppress gas generation resulting from the decomposition reaction of the electrolytic solution. Thus, superior battery characteristics are achievable.

In particular, in the laminated film type secondary battery in which the cathode 33, the anode 34, and the electrolyte layer 36 are contained inside the film-like outer package member 40, when gas is generated by the decomposition reaction of the electrolytic solution, swollenness of the secondary battery tends to become apparent due to an influence of pressure by the gas. Accordingly, suppression of the decomposition reaction of the electrolytic solution makes it possible to effectively suppress the swollenness of the secondary battery.

Functions and effects other than those described above are similar to those of the anode of the technology.

[3. Applications of Secondary Battery]

Next, description is given of application examples of any of the secondary batteries described above.

Applications of the secondary battery are not specifically limited as long as the secondary battery is applied to, for example, a machine, a device, an instrument, an apparatus, and a system (a collective entity of for example, a plurality of devices) that are able to use the secondary battery as a driving power source, an electric power storage source for electric power accumulation, or any other source. The secondary battery used as the power source may be a main power source (a power source used preferentially), or may be an auxiliary power source (a power source used instead of the main power source or used being switched from the main power source). In a case where the secondary battery is used as the auxiliary power source, the kind of the main power source is not limited to the secondary battery.

Examples of the applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include: a mobile lifestyle appliance such as an electric shaver; a storage device such as a backup power source and a memory card; an electric power tool such as an electric drill and an electric saw; a battery pack used as an attachable and detachable power source of, for example, a notebook personal computer; a medical electronic apparatus such as a pacemaker and a hearing aid; an electric vehicle such as an electric automobile (including a hybrid automobile); and an electric power storage system such as a home battery system for accumulating electric power for, for example, emergency. It goes without saying that the secondary battery may be employed for an application other than the applications mentioned above.

In particular, the secondary battery is effectively applicable to, for example but not limited to, the battery pack, the electric vehicle, the electric power storage system, the electric power tool, and the electronic apparatus. In these applications, superior battery characteristics are demanded, and using any of the secondary batteries according to the embodiments of the technology makes it possible to effectively improve performance. It is to be noted that the battery pack is a power source that uses the secondary battery, and may be, for example, a so-called assembled battery. The electric vehicle is a vehicle that operates (runs) using the secondary battery as a driving power source, and may be an automobile (such as a hybrid automobile) that includes together a drive source other than the secondary battery, as described above. The electric power storage system is a system that uses the secondary battery as an electric power storage source. For example, in a home electric power storage system, electric power is accumulated in the secondary battery that is the electric power storage source, which makes it possible to use, for example, home electric products with use of the accumulated electric power. The electric power tool is a tool in which a movable section (such as a drill) is allowed to be moved with use of the secondary battery as a driving power source. The electronic apparatus is an apparatus that executes various functions with use of the secondary battery as a driving power source (an electric power supply source).

Specific description is given of some application examples of the secondary battery. It is to be noted that configurations of the respective application examples described below are mere examples, and may be changed as appropriate.

[3-1. Battery Pack (Single Battery)]

FIG. 6 illustrates a block configuration of a battery pack. The battery pack may include, for example, a control section 61, a power source 62, a switch section 63, a current measurement section 64, a temperature detection section 65, a voltage detection section 66, a switch control, section 67, a memory 68, a temperature detection device 69, a current detection resistance 70, a cathode terminal 71, and an anode terminal 72, inside a housing 60. The housing 60 may be made of for example, a plastic material.

The control section 61 controls an operation of the entire battery pack (including a used state of the power source 62), and may include, for example, a CPU. The power source 62 includes one or more secondary batteries (not illustrated). The power source 62 may be, for example, an assembled battery that includes two or more secondary batteries. The secondary batteries may be connected in series, in parallel, or in series-parallel combination. To give an example, the power source 62 may include six secondary batteries in which two sets of series-connected three batteries are connected in parallel to each other.

The switch section 63 switches the used state of the power source 62 (whether or not the power source 62 is connectable to an external device) according to an instruction of the control section 61. The switch section 63 may include, for example, a charge control switch, a discharge control switch, a charging diode, and a discharging diode (each of which is not illustrated). The charge control switch and the discharge control switch may each be, for example, a semiconductor switch such as a field-effect transistor that uses a metal oxide semiconductor (a MOSFET).

The current measurement section 64 measures a current with use of the current detection resistance 70, and outputs a result of the measurement to the control section 61. The temperature detection section 65 measures a temperature with use of the temperature detection device 69, and outputs a result of the measurement to the control section 61. The temperature measurement result may be used, for example but not limited to, in a case where the control section 61 performs charge and discharge control at the time of abnormal heat generation and in a case where the control section 61 performs a correction process at the time of calculating remaining capacity. The voltage detection section 66 measures voltages of the secondary batteries in the power source 62, performs analog-to-digital conversion on the measured voltages, and supplies the resultant to the control section 61.

The switch control section 67 controls an operation of the switch section 63 according to signals inputted from the current measurement section 64 and the voltage detection section 66.

For example, in a case where the battery voltage reaches an overcharge detection voltage, the switch control section 67 may so cause the switch section 63 (the charge control switch) to be disconnected that a charge current does not flow into a current path of the power source 62. This makes it possible to perform only discharge through the discharging diode in the power source 62. It is to be noted that, for example, when a large current flows during charge, the switch control section 67 may block the charge current.

Also, for example, in a case where the battery voltage reaches an overdischarge detection voltage, the switch control section 67 may so cause the switch section 63 (the discharge control switch) to be disconnected that a discharge current does not flow into the current path of the power source 62. This makes it possible to perform only charge through the charging diode in the power source 62. It is to be noted that, for example, when a large current flows during discharge, the switch control section 67 may block the discharge current.

It is to be noted that the overcharge detection voltage of the secondary battery may be, for example, 4.20 V±0.05 V, and the overdischarge detection voltage may be, for example, 2.4 V±0.1 V.

The memory 68 may be, for example, an EEPROM that is a non-volatile memory. The memory 68 may hold, for example, numerical values calculated by the control section 61 and information of the secondary battery measured in a manufacturing process (such as internal resistance in an initial state). It is to be noted that, in a case where the memory 68 holds full charge capacity of the secondary battery, the control section 61 is allowed to comprehend information such as remaining capacity.

The temperature detection device 69 measures a temperature of the power source 62, and outputs a result of the measurement to the control section 61. The temperature detection device 69 may be, for example, a thermistor.

The cathode terminal 71 and the anode terminal 72 are terminals that may be coupled to, for example, an external device (such as a notebook personal computer) driven with use of the battery pack or an external device (such as a battery charger) used for charging the battery pack. The power source 62 is charged and discharged via the cathode terminal 71 and the anode terminal 72.

(3-2. Electric Vehicle)

FIG. 7 illustrates a block configuration of a hybrid automobile that is an example of an electric vehicle. The electric vehicle may include, for example, a control section 74, an engine 75, a power source 76, a driving motor 77, a differential 78, an electric generator 79, a transmission 80, a clutch 81, inverters 82 and 83, and various sensors 84 inside a housing 73 made of metal. Other than the components mentioned above, the electric vehicle may include, for example, a front drive shaft 85 and a front tire 86 that are coupled to the differential 78 and the transmission 80, and a rear drive shaft 87, and a rear tire 88.

The electric vehicle may be runnable with use of one of the engine 75 and the motor 77 as a drive source, for example. The engine 75 is a main power source, and may be, for example, a petrol engine. In a case where the engine 75 is used as the power source, drive power (torque) of the engine 75 may be transferred to the front tire 86 or the rear tire 88 via the differential 78, the transmission 80, and the clutch 81 that are drive sections, for example. It is to be noted that the torque of the engine 75 may be also transferred to the electric generator 79. With use of the torque, the electric generator 79 generates alternating-current electric power. The generated alternating-current electric power is converted into direct-current electric power via the inverter 83, and the converted power is accumulated in the power source 76. In a case where the motor 77 that is a conversion section is used as the power source, electric power (direct-current electric power) supplied from the power source 76 is converted into alternating-current electric power via the inverter 82, and the motor 77 is driven with use of the alternating-current electric power. Drive power (torque) obtained by converting the electric power by the motor 77 may be transferred to the front tire 86 or the rear tire 8 via the differential 78, the transmission 80, and the clutch 81 that are the drive sections, for example.

It is to be noted that, when speed of the electric vehicle is decreased by an unillustrated brake mechanism, resistance at the time of speed reduction may be transferred to the motor 77 as torque, and the motor 77 may generate alternating-current electric power by utilizing the torque. It may be preferable that this alternating-current electric power be converted into direct-current electric power via the inverter 82, and the direct-current regenerative electric power be accumulated in the power source 76.

The control section 74 controls an operation of the entire electric vehicle, and may include, for example, a CPU. The power source 76 includes one or more secondary batteries (not illustrated). The power source 76 may be coupled to an external power source, and the power source 76 may be allowed to accumulate electric power by receiving electric power supply from the external power source. The various sensors 84 may be used, for example, for controlling the number of revolutions of the engine 75 and for controlling an opening level (a throttle opening level) of an unillustrated throttle valve. The various sensors 84 may include, for example, a speed sensor, an acceleration sensor, and an engine frequency sensor.

It is to be noted that, although the description has been given of the case where the electric vehicle is the hybrid automobile, the electric vehicle may be a vehicle (an electric automobile) that operates with use of only the power source 76 and the motor 77 and without using the engine 75.

(3-3. Electric Power Storage System)

FIG. 8 illustrates a block configuration of an electric power storage system. The electric power storage system may include, for example, a control section 90, a power source 91, a smart meter 92, and a power hub 93, inside a house 89 such as a general residence or a commercial building.

In this example, the power source 91 may be coupled to an electric device 94 provided inside the house 89 and may be allowed to be coupled to an electric vehicle 96 parked outside the house 89, for example. Also, for example, the power source 91 may be coupled to a private power generator 95 provided in the house 89 via the power hub 93, and may be allowed to be coupled to an outside concentrating electric power system 97 via the smart meter 92 and the power hub 93.

It is to be noted that the electric device 94 may include, for example, one or more home electric products. Examples of the home electric products may include a refrigerator, an air conditioner, a television, and a water heater. The private power generator 95 may include, for example, one or more of a solar power generator, a wind power generator, and other power generators. The electric vehicle 96 may include, for example, one or more of an electric automobile, an electric motorcycle, a hybrid automobile, and other electric vehicles. The concentrating electric power system 97 may include, for example, one or more of a thermal power plant, an atomic power plant, a hydraulic power plant, a wind power plant, and other power plants.

The control section 90 controls an operation of the entire electric power storage system (including a used state of the power source 91), and may include, for example, a CPU. The power source 91 includes one or more secondary batteries (not illustrated). The smart meter 92 may be an electric power meter that is compatible with a network and is provided in the house 89 demanding electric power, and may be communicable with an electric power supplier, for example. Accordingly, for example, while the smart meter 92 communicates with outside, the smart meter 92 controls balance between supply and demand in the house 89, which allows for effective and stable energy supply.

In the electric power storage system, for example, electric power may be accumulated in the power source 91 from the concentrating electric power system 97, that is an external power source, via the smart meter 92 and the power hub 93, and electric power may be accumulated in the power source 91 from the private power generator 95, that is an independent power source, via the power hub 93. The electric power accumulated in the power source 91 is supplied to the electric device 94 and the electric vehicle 96 according to an instruction from the control section 90. This allows the electric device 94 to be operable, and allows the electric vehicle 96 to be chargeable. In other words, the electric power storage system is a system that makes it possible to accumulate and supply electric power in the house 89 with use of the power source 91.

The electric power accumulated in the power source 91 is allowed to be utilized optionally. Hence, for example, electric power may be accumulated in the power source 91 from the concentrating electric power system 97 in the middle of night when an electric rate is inexpensive, and the electric power accumulated in the power source 91 may be used during daytime hours when the electric rate is expensive.

It is to be noted that the electric power storage system described above may be provided for each household (each family unit), or may be provided for a plurality of households (a plurality of family units).

[3-5. Electric Power Tool]

FIG. 9 illustrates a block configuration of an electric power tool. The electric power tool may be, for example, an electric drill, and may include a control section 99 and a power source 100, inside a tool body 98 made of a plastic material, for example. A drill section 101 that is a movable section may be attached to the tool body 98 in an operable (rotatable) manner, for example.

The control section 99 controls an operation of the entire electric power tool (including a used state of the power source 100), and may include, for example, a CPU. The power source 100 includes one or more secondary batteries (not illustrated). The control section 99 allows electric power to be supplied from the power source 100 to the drill section 101 according to an operation by an unillustrated operation switch.

EXAMPLES

Specific examples of embodiments of the technology are described in detail.

Experimental Examples 1-1 to 1-35

The laminated film type secondary battery (lithium-ion secondary battery) illustrated in FIG. 4 and FIG. 5 was fabricated by the following procedure.

The cathode 21 was fabricated as follows. First, 92 parts by mass of a cathode active material ($LiCoO_2$ as the lithium transition metal composite oxide), 5 parts by mass of a cathode binder (polyvinylidene fluoride), and 3 parts by mass of a cathode conductor (ketjen black) were mixed to obtain a cathode mixture. In this case, a metal salt was contained in the cathode mixture on as-necessary basis. As the carboxylate-type compound, LiO—$C_3H_6$—$CO_2Li$ (AAL), LiO—$C_2H_4$—$CO_2Li$ (PRAL), LiO—$C_3H_6$—$CO_2Li$ (BAL) and LiO—$C_4H_8$—$CO_2Li$ (PEAL) were used. As the sulfonic acid compound, LiO—$C_3H_6$—$SO_3Li$ (PRSAL) was used. Note that, in order to contain the metal salt in the cathode mixture, in a reference composition (mixture ratio) containing 92 parts by mass of the cathode active material, 5 parts by mass of the cathode binder, and the 3 parts by mass of the cathode conductor, part of the cathode active material was replaced by the metal salt. The content of the metal salt are as illustrated in Table 1. Subsequently, the cathode mixture was dispersed in an organic solvent (N-methyl-2-pyrrolidone) to obtain cathode mixture slurry. Subsequently, both surfaces of the cathode current collector 53A (an aluminum foil having a thickness of 10 μm) were coated with the cathode mixture slurry, and thereafter, the cathode mixture slurry was dried to form the cathode active material layer 33B. Subsequently, the cathode active material layer 33B was compression-molded with use of a roll pressing machine. In this case, the thickness of the cathode active material layer 33B on one of the surfaces of the cathode current collector 33A was 30 μm, and volume density of the cathode active material layer 33B was 3.5 g/cm$^3$. Lastly, the cathode current collector 33A provided with the cathode active material layer 33B was cut into a strip shape (50 m×300 mm).

The anode 34 was fabricated as follows. First, an anode active material (Li$_4$Ti$_5$O$_{12}$ as the high-potential material), an anode binder (polyvinylidene fluoride), an anode conductor (ketjen black), and a metal salt were mixed to obtain an anode mixture. As the carboxylate-type compound, AAL, PRAL, BAL, and PEAL were used, and as the sulfonic acid compound, PRSAL and KO—C$_3$H$_6$—SO$_3$K (PRSAK) were used. In this case, in a reference composition (mixture ratio) containing 85 parts by mass of the anode active material, 5 parts by mass of the anode binder, and 10 parts by mass of the anode conductor, part of the anode active material was replaced by the metal salt. The content of the metal salt is as illustrated in Table 1. Subsequently, the anode mixture was dispersed in an organic solvent (N-methyl-2-pyrrolidone) to obtain anode mixture slurry. Subsequently, both surfaces of the anode current collector 34A (an aluminum foil having a thickness of 10 μm) were coated with the anode mixture slurry, and thereafter, the anode mixture slurry was dried to form the anode active material layer 34B. Subsequently, the anode active material layer 34B was compression-molded with use of a roll pressing machine. In this case, the thickness of the anode active material layer 34B on one of the surfaces of the anode current collector 34A was 30 μm, and volume density of the anode active material layer 34B was 1.8 g/cm$^3$. Lastly, the anode current collector 34A provided with the anode active material layer 34B was cut into a strip shape (50 m×300 mm).

An electrolytic solution was prepared as follows. An electrolyte salt (LiPF$_6$) was dissolved in a solvent. A mixture of ethylene carbonate (EC), ethyl methyl carbonate (EMC), and vinylene carbonate (VC) was used as the solvent. In this case, a mixture ratio of EC and EMC was EC:EMC=30:70 in weight ratio, the content of VC was 1 wt % of the total of EC and EMC, and the content of the electrolyte salt was 1 mol/kg with respect to the entire solvent.

The secondary battery was assembled as follows. The cathode lead 31 made of aluminum was welded to the cathode current collector 33A of the cathode 33, and the anode lead 26 made of copper was welded to the anode current collector 34A of the anode 34. Subsequently, the cathode 33 and the anode 34 were stacked with the separator 35 (a microporous polyethylene film having a thickness of 16 μm) in between, and the resultant stacked body was spirally wound in a longitudinal direction to fabricate the spirally wound electrode body 30. Thereafter, the protective tape 37 was attached onto the outermost periphery of the spirally wound electrode body 30. Subsequently, after the spirally wound electrode body 30 was sandwiched between two film-like outer package members 40, outer edges on three sides of the outer package members 40 were thermally fusion-bonded to form a pouch. The outer package members 40 were each a moisture-resistant aluminum laminated film in which a25-μm-thick nylon film, an 40-μm-thick aluminum foil, and a 30-μm-thick polypropylene film were laminated from outside. Lastly, 2 g of the electrolyte solution was injected into the pouch formed of the outer package members 40, and the separator 35 was impregnated with the electrolytic solution. Thereafter outer edges on the remaining one side of the outer package members 40 were thermally fusion-bonded to each other in a reduced-pressure environment.

Note that, for comparison, secondary batteries were fabricated in a similar procedure except for the following changes.

Firstly, the metal salt was not contained in the anode mixture. Secondly, the metal salt was contained only in the cathode mixture. In this case, in a reference composition containing 92 parts by mass of the cathode active material, 5 parts by mass of the cathode binder, and 3 parts by mass of the cathode electric conductor, part of the cathode active material was replaced by the metal salt. The content of the metal salt was as illustrated in Table 2. Thirdly, as the anode active material, a carbon material (artificial graphite: C) was used instead of the high-potential material (Li$_4$Ti$_5$O$_{12}$), and a mixture (C+Si) of a carbon material (artificial graphite) and a metal-based material (silicon) was used. The mixture ratio of the carbon material and the metal-based material in the mixture was 50:50 in weight ratio. Fourthly, the metal salt was not contained in the anode mixture, and an additive (hydroxyacetic acid: AA) was contained in the electrolytic solution. In this case, the content of the additive in the solvent (containing ethylene carbonate, ethyl methyl carbonate, and vinylenes carbonate) was 0.5 wt %. Fifthly, HO—CH$_2$—CO$_2$Li (HAL) was used instead of LiO—CH$_2$—Li (AAL).

When cycle characteristics and swelling characteristics were examined as battery characteristics of each of the secondary batteries, results illustrated in Table 1 and Table 2 were obtained.

The cycle characteristics were examined as follows. One cycle of charge and discharge was performed on the secondary battery in an ambient temperature environment (23° C.) to stabilize a battery state of the secondary battery, and thereafter, one cycle of charge and discharge was further performed on the secondary battery in the same environment to measure discharge capacity. Subsequently, the secondary battery was repeatedly charged and discharged until the total number of cycles reached 300 cycles in a high-temperature environment (65° C.) to measure discharge capacity. A cycle retention ratio (%)=(discharge capacity at the 300th cycle/discharge capacity at the second cycle)×100 was calculated from these results. When the secondary battery was charged, charge was performed at a current of 0.2 C until the voltage reached 2.7 V. and charge was further performed at a voltage of 2.7 V until the current reached 0.05 C. When the secondary battery was discharged, discharge was performed at a current of 0.2 C until the voltage reached 1.5 V. The "0.2 C" refers to a current value at which the battery capacity (theoretical capacity) is completely discharged in 5 hours, and the "0.05 C" refers to a current value at which the battery capacity (theoretical capacity) is completely discharged in 20 hours.

The swelling characteristics were determined as follows. One cycle of charge and discharge was performed on the secondary battery having a battery state stabilized by a similar procedure to the procedure of examining the cycle characteristics in the ambient temperature environment (23° C.), and thereafter, the thickness of the secondary battery was measured. Subsequently, the secondary battery was charged again in the same environment, and the secondary battery kept in a charged state was stored in a constant-temperature bath (80° C.) for 24 hours, and thereafter, the secondary battery was discharged in the ambient temperature environment, and the thickness of the secondary battery was measured. A thickness change ratio (%)=[(thickness after storage−thickness before storage)/thickness before storage]×100 was calculated from these results. The charge and discharge conditions were similar to those in the case of examining the cycle characteristics, except that when the secondary battery was charged again, the secondary battery was charged until 3 hours passed.

metal salt, the cycle retention ratio was remarkably increased, and the thickness change ratio was remarkably decreased.

This result indicates that when the anode active material layer 34B contains the metal salt together with the high-potential material, the anode 34 is chemically stabilized by

TABLE 1

| Experimental Example | Cathode | | | Anode | | | Electrolytic Solution Solvent | Cycle Retention Ratio (%) | Thickness Change Ratio (%) |
|---|---|---|---|---|---|---|---|---|---|
| | Cathode Active Material | Metal Salt Kind | Content (wt %) | Anode Active Material | Metal Salt Kind | Content (wt %) | | | |
| 1-1 | LiCoO$_2$ | — | — | Li$_4$Ti$_5$O$_{12}$ | AAL | 0.5 | EC + EMC + VC | 90 | 2.3 |
| 1-2 | | | | | | 1 | | 90 | 2.2 |
| 1-3 | | | | | | 3 | | 87 | 2 |
| 1-4 | | | | | PRAL | 0.5 | | 90 | 2 |
| 1-5 | | | | | | 1 | | 88 | 2 |
| 1-6 | | | | | | 3 | | 86 | 1.9 |
| 1-7 | | | | | BAL | 0.5 | | 88 | 1.8 |
| 1-8 | | | | | | 1 | | 86 | 1.6 |
| 1-9 | | | | | | 3 | | 85 | 1.6 |
| 1-10 | | | | | PEAL | 0.5 | | 85 | 2.2 |
| 1-11 | | | | | | 1 | | 84 | 2.4 |
| 1-12 | | | | | | 3 | | 80 | 2.4 |
| 1-13 | | | | | PRSAL | 0.5 | | 87 | 2.1 |
| 1-14 | | | | | | 1 | | 87 | 2 |
| 1-15 | | | | | | 3 | | 86 | 1.6 |
| 1-16 | | | | | PRSAK | 0.5 | | 82 | 2 |
| 1-17 | | | | | | 1 | | 76 | 1.4 |
| 1-18 | | | | | | 3 | | 74 | 1.4 |
| 1-19 | LiCoO$_2$ | AAL | 1 | Li$_4$Ti$_5$O$_{12}$ | AAL | 1 | | 77 | 2.1 |
| 1-20 | | PRAL | 1 | | PRAL | 1 | | 76 | 2 |
| 1-21 | | BAL | 1 | | BAL | 1 | | 77 | 1.6 |
| 1-22 | | PEAL | 1 | | PEAL | 1 | | 75 | 2.2 |
| 1-23 | | PRSAL | 1 | | PRSAL | 1 | | 79 | 1.8 |

TABLE 2

| Experimental Example | Cathode | | | Anode | | | Electrolytic Solution Solvent | Cycle Retention Ratio (%) | Thickness Change Ratio (%) |
|---|---|---|---|---|---|---|---|---|---|
| | Cathode Active Material | Metal Salt Kind | Content (wt %) | Anode Active Material | Metal Salt Kind | Content (wt %) | | | |
| 1-24 | LiCoO$_2$ | — | — | Li$_4$Ti$_5$O$_{12}$ | — | — | EC + EMC + VC | 72 | 12.3 |
| 1-25 | LiCoO$_2$ | AAL | 1 | Li$_4$Ti$_5$O$_{12}$ | — | — | | 72 | 13.5 |
| 1-26 | | PRAL | 1 | | | | | 72 | 12.4 |
| 1-27 | | BAL | 1 | | | | | 72 | 12.3 |
| 1-28 | | PEAL | 1 | | | | | 72 | 12.8 |
| 1-29 | | PRSAL | 1 | | | | | 72 | 13.4 |
| 1-30 | LiCoO$_2$ | — | — | C | AAL | 1 | | 69 | 7.4 |
| 1-31 | | | | | — | — | | 70 | 7.3 |
| 1-32 | LiCoO$_2$ | — | — | C + Si | AAL | 1 | | 68 | 7.4 |
| 1-33 | | | | | — | — | | 68 | 7.4 |
| 1-34 | LiCoO$_2$ | — | — | Li$_4$Ti$_5$O$_{12}$ | — | — | EC + EMC + VC + AA | 68 | 15.5 |
| 1-35 | LiCoO$_2$ | — | — | Li$_4$Ti$_5$O$_{12}$ | HAL | 1 | EC + EMC + VC | 70 | 13.8 |

The cycle retention ratio and the thickness change ratio in the case where the metal salt was not used (Experimental Example 1-24) are used as reference. The cycle retention ratio and the thickness change ratio were changed as follows, depending on the configuration of the secondary battery.

Firstly, in the case where the high-potential material was used as the anode active material, when the anode active material layer 34B contained the metal salt (Experimental Examples 1-1 to 1-23), independently of the kind of the the synergistic effect of the high-potential material and the metal salt. This makes it possible to suppress decomposition reaction of the electrolytic solution, thereby suppressing gas generation.

In particular, in the case where the anode active material layer 34B contained the metal salt, the following tendency was obtained. First, when the content of the metal salt in the anode active material layer 34B was from 0.5 wt % to 3 wt % both inclusive, the cycle retention ratio was sufficiently increased, and the thickness change ratio was sufficiently decreased. Moreover, when the value of "a" in the formula (1) relating to the carboxylic acid compound and the value of "e" in the formula (2) relating to the sulfonic acid compound were each 4 or smaller, the cycle retention ratio was sufficiently increased, and the thickness change ratio was sufficiently decreased. In this case, when the value of "a" and the value of "e" were each 3 or smaller, the cycle retention ratio was further increased.

Note that, in the case where the case where the anode active material layer 349 contained the metal salt, when the cathode active material layer 33B also contained the metal salt (Experimental Examples 1-19 to 1-23), compared to when the cathode active material layer 339 did not contain the metal salt (Experimental Examples 1-1 to 1-18), the cycle retention ratio was decreased, but in some cases, the thickness change ratio was decreased.

Secondly, in the case where the anode active material contained the high potential material, when only the cathode active material layer 339 contained the metal salt (Experimental Examples 1-25 to 1-29), independently of the kind of the metal salt, the cycle retention ratio was equal, and the thickness change ratio was equal or higher.

This result indicates that when the cathode active material layer 339 contains the metal salt, in spite of the fact that the anode active material layer 34B contains the high-potential material, the foregoing synergistic effect of the high-potential material and the metal salt is not obtained, and decomposition reaction of the electrolytic solution is not suppressed accordingly. On the contrary, when the neat salt is used, a decrease in the cycle retention ratio is prevented, but the thickness change ratio is increased.

Thirdly, in the case where the anode active material layer 34B contained the carbon material, when the anode active material layer 34B contained the metal salt (Experimental Example 1-30), compared to when the anode active material layer 34B did not contain the metal salt (Experimental Example 1-31), the cycle retention ratio was decreased, and the thickness change ratio was increased. Moreover, in the case where the anode active material layer 34B contained the mixture of the carbon material and the metal-based material, the cycle retention ratio and the thickness change ratio when the anode active material layer 34B contained the metal salt (Experimental Example 1-32) were both equal to those when the anode active material layer 34B did not contain the metal salt (Experimental Example 1-33).

This result indicates that the foregoing synergistic effect is a special advantage obtained only in the case where the high-potential material and the metal salt are combined, and this advantage is not obtained in a case where a material other than the high-potential material and the metal salt are combined.

Fourthly, in the case where the anode active material layer 34B contained the high-potential material, when the electrolytic solution contained the nonmetal salt (AA) (Experimental Example 1-34), the cycle retention ratio was decreased, and the thickness change ratio was increased.

This result indicates that when the electrolytic solution contains a material similar to the metal salt (e.g. AA that is the nonmetal salt), the foregoing synergistic effect is not achieved, and the cycle retention ratio and the thickness change ratio both become worse.

Fifthly, in the case where the anode active material layer 34B contained the high-potential material, when the dimetal salt (AAL) was used, as described above, the cycle retention ratio was increased, and the thickness change ratio was decreased. When the monometal salt (HAL) was used (Experimental Example 1-35), the cycle retention ratio was decreased, and the thickness change ratio was increased.

This result indicates that even though the monometal salt (HAL) and the dimetal salt (AAL) differ from each other only in the number of metal elements, such a difference in the number of metal elements significantly influences the cycle retention ratio and the thickness change ratio.

Experimental Examples 2-1 to 2-3

As illustrated in Table 3, the secondary batteries were fabricated in a similar procedure except that γ-butyrolactone (GBL) was contained in the solvent of the electrolytic solution, and battery characteristics of the secondary batteries were examined. In this case, a mixture ratio of EC, EMC, and GBL was EC:EMC:GBL=30:40:30, the content of VC was 1 wt % of the total of EC, EMC, and GBL.

TABLE 3

| | Cathode | Anode | Metal Salt | | Electrolytic | Cycle Retention | Thickness Change |
| --- | --- | --- | --- | --- | --- | --- | --- |
| Experimental Example | Cathode Active Material | Anode Active Material | Kind | Content (wt %) | Solution Solvent | Ratio (%) | Ratio (%) |
| 2-1 | LiCoO$_2$ | Li$_4$Ti$_5$O$_{12}$ | AAL | 1 | EC + EMC + VC + GBL | 91 | 1.4 |
| 2-2 | | | BAL | 1 | | 87 | 1.1 |
| 2-3 | | | PRSAL | 1 | | 87 | 1.3 |

When the solvent of the electrolytic solution contained GBL (Experimental Examples 2-1 to 2-3), compared to when the solvent of the electrolytic solution did not contain GBL (Experimental Examples 1-2, 1-8, and 1-14), the cycle retention ratio was equal or higher, and the thickness change ratio was decreased.

Experimental Example 3-1 to 3-15

As illustrated in Table 4, the secondary batteries were fabricated in a similar procedure except that, as the cathode active material, a lithium transition metal phosphate compound (LiFePO$_4$) was used instead of the lithium transition metal composite oxide (LiCoO$_2$), and the battery characteristics of the secondary batteries were examined.

TABLE 4

| Experimental Example | Cathode | | | Anode | | | Electrolytic Solution Solvent | Cycle Retention Ratio (%) | Thickness Change Ratio (%) |
|---|---|---|---|---|---|---|---|---|---|
| | Cathode Active Material | Metal Salt Kind | Content (wt %) | Anode Active Material | Metal Salt Kind | Content (wt %) | | | |
| 3-1 | LiFePO$_4$ | — | — | Li$_4$Ti$_5$O$_{12}$ | AAL | 1 | EC + EMC + VC | 94 | 1.8 |
| 3-2 | | | | | BAL | 1 | | 93 | 1.2 |
| 3-3 | | | | | PRSAL | 1 | | 92 | 1.4 |
| 3-4 | LiFePO$_4$ | — | — | Li$_4$Ti$_5$O$_{12}$ | AAL | 1 | EC + EMC + VC + GBL | 95 | 0.9 |
| 3-5 | | | | | BAL | 1 | | 93 | 0.8 |
| 3-6 | | | | | PRSAL | 1 | | 93 | 1 |
| 3-7 | LiFePO$_4$ | — | — | Li$_4$Ti$_5$O$_{12}$ | — | — | EC + EMC + VC | 88 | 9.7 |
| 3-8 | LiFePO$_4$ | AAL | 1 | Li$_4$Ti$_5$O$_{12}$ | — | — | | 88 | 10.5 |
| 3-9 | | PRAL | 1 | | | | | 88 | 9.8 |
| 3-10 | | PRSAL | 1 | | | | | 86 | 10.1 |
| 3-11 | LiFePO$_4$ | — | — | C | AAL | 1 | | 80 | 5.6 |
| 3-12 | | | | | — | — | | 78 | 5.6 |
| 3-13 | LiFePO$_4$ | — | — | C + Si | AAL | 1 | | 78 | 5.6 |
| 3-14 | | | | | — | — | | 77 | 5.8 |
| 3-15 | LiFePO$_4$ | — | — | Li$_4$Ti$_5$O$_{12}$ | — | — | EC + EMC + VC + AA | 86 | 17.2 |

Results obtained in the case where the lithium transition metal composite oxide was used as the cathode active material (Table 4) were similar to those in the case where the lithium transition metal phosphate compound was used (Tables 1 to 3). More specifically, in the case where the high-potential material was used as the anode active material, when the anode active material layer 34B contained the metal salt (Experimental Examples 3-1 to 3-6), compared to the other cases (Experimental Examples 3-7 to 3-15), the cycle retention ratio was remarkably increased, and the thickness change ratio was remarkably decreased.

As can be seen from the results illustrated in Tables 1 to 4, in the case where the anode active material contained the high-potential material, when the anode contained the metal salt together with the high-potential material, superior battery characteristics were obtained.

The technology has been described above referring to some embodiments and examples. However, the technology is not limited to the embodiments and the examples, and may be variously modified. For example, the description has been given with referring to examples in which the battery structure is of the cylindrical type, the laminated film type, and a coin type, and the battery device has the spirally wound structure. However, the battery structure and the battery device structure are not limited thereto. The secondary battery according to any of the embodiments of the technology is similarly applicable also to a case where other battery structure such as that of a square type or a button type is employed. Moreover, the secondary battery according to any of the embodiments of the technology is similarly applicable also to a case in which the battery device has other structure such as a laminated structure.

Moreover, the electrode reactant is not limited to lithium, and may be any of other Group 1 elements such as sodium and potassium. Group 2 elements such as magnesium and calcium, and other light-metal such as aluminum. Since the effects of the embodiments of the technology are expected to be achieved independently of the kind of the electrode reactant, similar effects are achievable, even if the kind of the electrode reactant is changed.

Further, the secondary battery-use anode of the technology is not limitedly applied to the secondary battery, and may be applied to other electrochemical device, for example. Examples of the other electrochemical device may include a capacitor.

Furthermore, description has been given of an appropriate range derived from the results of the examples for the range of the content of the metal salt in the anode active material layer. However, the description does not totally deny a possibility that the content of the metal salt becomes out of the foregoing range. That is, the foregoing appropriate range is a particularly preferable range to achieve the effects of the embodiments of the technology. Therefore, as long as the effects of the embodiments of the technology are achievable, the content of the metal salt may be out of the foregoing ranges in son degree. The same, is applicable to, for example but not limited to, the potential (potential to lithium) at which the electrode compound inserts and extracts the electrode reactant, the value of "a" in the formula (1), and the value of "e" in the formula (2).

It is to be noted that the effects described herein are mere examples. Effects of the embodiments of the technology are not limited thereto, and may include other effects.

The technology may have following configurations.

(1) A secondary battery including:
a cathode;
an anode; and
a nonaqueous electrolytic solution, wherein
the anode including
an anode active material containing an electrode compound, the electrode compound inserting and extracting an electrode reactant at a potential (a potential to lithium) of 1V to 3 V both inclusive, and
a metal salt containing one or both of a carboxylic acid compound represented by the following formula (1) and a sulfonic acid compound represented by the following formula (2),

[Chem. 5]

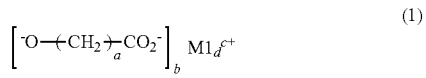

(1)

where M1 is one of an alkali metal element and an alkali-earth metal element, "a" is an integer of 1 or larger, each of "b", "c" and "d" is 1 or 2, and in a case of d=2, one M1 and the other M1 may be of a sane kind or different kinds, and

[Chem. 6]

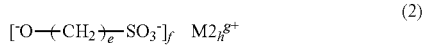

(2)

where M2 is one of an alkali metal element and an alkali-earth metal element, "e" is an integer of 1 or larger, each of "f", "g", and "h" is 1 or 2, and in a case of h=2, one M1 and the other M2 may be of a same kind or different kinds.

(2) The secondary battery according to (1), in which "a" in the formula (1) and "e" in the formula (2) are each an integer of 1 to 5 both inclusive.

(3) The secondary battery according to (1) or (2), in which M1 in the formula (1) and M2 in the formula (2) are each an alkali metal element.

(4) The secondary battery according to any one of (1) to (3), in which M1 in the formula (1) and the M2 in the formula (2) are each lithium (Li).

(5) The secondary battery according to any one of (1) to (4), in which the electrode compound includes one or more of lithium titanium composite oxides represented by the following formula (3), $$Li_wTi_xM3_yO_z \qquad (3)$$

where M3 is one or more of magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt), "w", "x", "y", and "z" satisfy 3≤w≤7, 3≤x≤5, 0≤y≤4, and 10≤z≤12.

(6) The secondary battery according to any one of (1) to (5), in which
the anode active material and the metal salt are contained in an anode active material layer, and
the content of the metal salt in the anode active material layer is from 0.5 wt % to 3 wt % both inclusive.

(7) The secondary battery according to any one of (1) to (6), in which the nonaqueous electrolytic solution includes γ-butyrolactone.

(8) The secondary battery according to any one of (1) to (7), in which the cathode, the anode, and the nonaqueous electrolytic solution are contained inside a film-like outer package member.

(9) The secondary battery according to any one of (1) to (8), in which the nonaqueous electrolytic solution is maintained by a polymer compound.

(10) A secondary battery-use anode including:
an anode active material containing an electrode compound, the electrode compound inserting and extracting an electrode reactant at a potential (a potential to lithium) of 1 V to 3 V both inclusive, and a metal salt containing one or both of a carboxylic acid compound represented by the following formula (1) and a sulfonic acid compound represented by the following formula (2),

[Chem. 7]

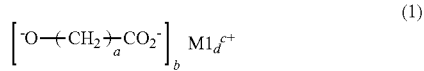

(1)

where M1 is one of an alkali metal element and an alkali-earth metal element, "a" is an integer of 1 or larger, each of "b", "c", and "d" is 1 or 2, and in a case of d=2, one M1 and the other M1 may be of a sane kind or different kinds.

[Chem. 8]

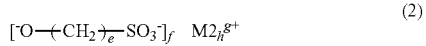

(2)

where M2 is one of an alkali metal element and an alkali-earth metal element, "e" is an integer of 1 or larger, each of "f", "g", and "h" is 1 or 2, and in a case of h=2, one M1 and the other M2 may be of a same kind or different kinds.

(11) A battery pack including:
the secondary batter y according to any one of (1) to (9);
a control section configured to control an operation of the secondary battery; and
a switch section configured to switch the operation of the secondary battery according to an instruction of the control section.

(12) An electric vehicle including:
the secondary battery according to any one of (1) to (9);
a conversion section configured to convert electric power supplied from the secondary battery into drive power;
a drive section configured to operate according to the drive power; and a control section configured to control an operation of the secondary battery.

(13) An electric power storage system including:
the secondary battery according to any one of (1) to (9);
one or more electric devices configured to be supplied with electric power from the secondary battery; and
a control section configured to control the supplying of the electric power from the secondary battery to the one or more electric devices.

(14) An electric power tool including:
the secondary battery according to any one of (1) to (9); and
a movable section configured to be supplied with electric power from the secondary battery.

(15) An electronic apparatus including the secondary battery according to any one of (1) to (9) as an electric power supply source.

The present application contains subject matter related to that disclosed in Japanese Priority Patent Application JP 2013-190031 filed in the Japan Patent Office on Sep. 13, 2013, the entire contents of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A secondary battery comprising:
a cathode;
an anode; and
a nonaqueous electrolytic solution, the anode including an anode active material mixture in an anode active material layer, wherein the anode active mixture includes an anode active material and a metal salt, wherein a content of the metal salt in the anode active material layer ranges from 0.5 wt % to 3 wt %, wherein the anode active material containing an electrode compound, the electrode compound inserting and extracting an electrode reactant at a potential (a potential to lithium) of 1 V to 3 V both inclusive, and wherein the metal salt containing one or both of a carboxylic acid compound represented by the following formula (1) and a sulfonic acid compound represented by the following formula (2),

[Chem. 1]

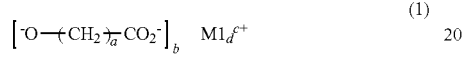
(1)

where M1 is one of an alkali metal element and an alkali-earth metal element, "a" is an integer of 1 to 4, each of "b", "c", and "d" is 1 or 2, and in a case of d=2, one M1 and the other M1 may be of a same kind or different kinds, and

[Chem. 2]

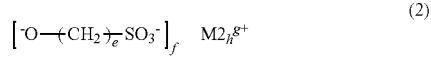
(2)

where M2 is one of an alkali metal element and an alkali-earth metal element, "e" is an integer of 1 to 4, each of "f", "g", and "h" is 1 or 2, and in a case of h=2, one M1 and the other M2 may be of a same kind or different kinds, wherein the carboxylic acid is selected from the group consisting of $LiO-CH_2-CO_2Li$, $LiO-C_2H_4-CO_2Li$, $LiO-C_3H_6-CO_2Li$, and $LiO-C_4H_8-CO_2Li$ and wherein the sulfonic acid is selected from the group consisting of $LiO-C_3H_6-SO_3Li$ and $KO-C_3H_6-SO_3K$.

2. The secondary battery according to claim 1, wherein the electrode compound includes one or more of lithium titanium composite oxides represented by the following formula (3), $$Li_wTi_xM3_yO_z \quad (3)$$

where M3 is one or more of magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt), "w", "x", "y", and "z" satisfy $3 \leq w \leq 7$, $3 \leq x \leq 5$, $0 \leq y \leq 4$, and $10 \leq z \leq 12$.

3. The secondary battery according to claim 1, wherein the nonaqueous electrolytic solution includes γ-butyrolactone.

4. The secondary battery according to claim 1, wherein the cathode, the anode, and the nonaqueous electrolytic solution are contained inside a film-like outer package member.

5. The secondary battery according to claim 1, wherein the nonaqueous electrolytic solution is held by a polymer compound.

6. A battery pack comprising:
a secondary battery according to claim 1;
a control section configured to control an operation of the secondary battery; and
a switch section configured to switch the operation of the secondary battery according to an instruction of the control section.

7. An electric vehicle comprising:
a secondary battery according to claim 1;
a conversion section configured to convert electric power supplied from the secondary battery into drive power;
a drive section configured to operate according to the drive power; and
a control section configured to control an operation of the secondary battery.

8. An electric power storage system comprising:
a secondary battery according to claim 1;
one or more electric devices configured to be supplied with electric power from the secondary battery; and
a control section configured to control the supplying of the electric power from the secondary battery to the one or more electric devices.

9. An electric power tool comprising:
a secondary battery according to claim 1; and
a movable section configured to be supplied with electric power from the secondary battery.

10. An electronic apparatus comprising a secondary battery according to claim 1 as an electric power supply source.

11. A secondary battery-use anode comprising:
an anode active material containing an electrode compound, the electrode compound inserting and extracting an electrode reactant at a potential (a potential to lithium) of 1 V to 3 V both inclusive, and
a metal salt containing one or both of a carboxylic acid compound represented by the following formula (1) and a sulfonic acid compound represented by the following formula (2),

[Chem. 3]

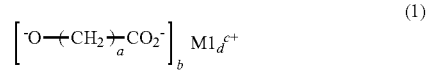
(1)

where M1 is one of an alkali metal element and an alkali-earth metal element, "a" is an integer of 1 or larger, each of "b", "c", and "d" is 1 or 2, and in a case of d=2, one M1 and the other M1 may be of a same kind or different kinds, and

[Chem. 4]

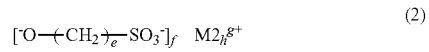
(2)

where M2 is one of an alkali metal element and an alkali-earth metal element, "e" is an integer of 1 or larger, each of "f", "g", and "h" is 1 or 2, and in a case of h=2, one M1 and the other M2 may be of a same kind or different kinds, wherein the carboxylic acid is selected from the group consisting of $LiO-CH_2-CO_2Li$, $LiO-C_2H_4-CO_2Li$, $LiO-C_3H_6-CO_2Li$, and $LiO-C_4H_8-CO_2Li$, wherein the sulfonic acid is selected from the group consisting of $LiO-C_3H_6-SO_3Li$ and $KO-C_3H_6-SO_3K$, and wherein a content of the metal salt ranges from 0.5 wt % to 3 wt %.

* * * * *